(12) United States Patent
Gupta et al.

(10) Patent No.: US 11,301,295 B1
(45) Date of Patent: Apr. 12, 2022

(54) IMPLEMENTING AN APPLICATION SPECIFIED AS A DATA FLOW GRAPH IN AN ARRAY OF DATA PROCESSING ENGINES

(71) Applicant: Xilinx, Inc., San Jose, CA (US)

(72) Inventors: Shail Aditya Gupta, San Jose, CA (US); Rishi Surendran, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 391 days.

(21) Appl. No.: 16/421,434

(22) Filed: May 23, 2019

(51) Int. Cl.
*G06F 9/46* (2006.01)
*G06F 9/50* (2006.01)
*G06F 16/901* (2019.01)
*G06F 13/28* (2006.01)

(52) U.S. Cl.
CPC ............ *G06F 9/5005* (2013.01); *G06F 13/28* (2013.01); *G06F 16/9024* (2019.01)

(58) Field of Classification Search
CPC ..... G06F 9/5005; G06F 16/9024; G06F 13/28
USPC ........................................................ 718/104
See application file for complete search history.

(56) References Cited

U.S. PATENT DOCUMENTS

| | | | |
|---|---|---|---|
| 3,776,137 A | 12/1973 | Abbott | |
| 4,876,641 A | 10/1989 | Cowley | |
| 5,848,264 A | 12/1998 | Baird et al. | |
| 6,075,935 A | 6/2000 | Ussery | |
| 6,080,204 A | 6/2000 | Mendel | |
| 6,090,156 A | 7/2000 | MacLeod | |
| 6,091,263 A | 7/2000 | New et al. | |
| 6,150,839 A | 11/2000 | New et al. | |
| 6,195,788 B1 | 2/2001 | Leaver | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,759,869 B1 | 7/2004 | Young et al. | |
| 6,781,407 B2 | 8/2004 | Schultz | |
| 6,810,514 B1 | 10/2004 | Alfke et al. | |
| 6,836,842 B1 | 12/2004 | Guccione et al. | |

(Continued)

FOREIGN PATENT DOCUMENTS

| CN | 101650698 A | * | 2/2010 |
|---|---|---|---|
| CN | 105681153 A | * | 6/2016 |

(Continued)

OTHER PUBLICATIONS

English translation of KR-101541534-B1 (Year: 2015).*

(Continued)

*Primary Examiner* — Bradley A Teets
(74) *Attorney, Agent, or Firm* — Kevin T. Cuenot

(57) ABSTRACT

Implementing an application using a plurality of data processing engines (DPEs) can include, in a first pass, mapping, using computer hardware, a data flow graph onto an array of DPEs by minimizing direct memory access (DMA) circuit usage and memory conflicts in the array of DPEs and, in response to determining that a mapping solution generated by the first pass requires an additional DMA circuit not specified by the data flow graph, inserting, using the computer hardware, additional buffers into the data flow graph. In a second pass, the additional buffers can be mapped, using the computer hardware, onto the array of DPEs by minimizing the memory conflicts in the array of DPEs.

20 Claims, 10 Drawing Sheets

(56) References Cited

U.S. PATENT DOCUMENTS

| | | | |
|---|---|---|---|
| 6,907,595 B2 | 6/2005 | Curd et al. | |
| 7,024,651 B1 | 4/2006 | Camilleri et al. | |
| 7,057,413 B1 | 6/2006 | Young et al. | |
| 7,080,283 B1 | 7/2006 | Songer et al. | |
| 7,124,338 B1 | 10/2006 | Mark et al. | |
| 7,185,309 B1 | 2/2007 | Kulkarni et al. | |
| 7,199,608 B1 | 4/2007 | Trimberger | |
| 7,224,184 B1 | 5/2007 | Levi et al. | |
| 7,281,093 B1 | 10/2007 | Kulkarni et al. | |
| 7,301,822 B1 | 11/2007 | Walstrum, Jr. et al. | |
| 7,302,625 B1 | 11/2007 | Payakapan et al. | |
| 7,454,658 B1 | 1/2008 | Baxter | |
| 7,328,335 B1 | 2/2008 | Sundararajan et al. | |
| 7,380,035 B1 | 5/2008 | Donlin | |
| 7,394,288 B1 | 7/2008 | Agarwal | |
| 7,420,392 B2 | 9/2008 | Schultz et al. | |
| 7,477,072 B1 | 1/2009 | Kao et al. | |
| 7,478,357 B1 | 1/2009 | Mason et al. | |
| 7,482,836 B2 | 1/2009 | Levi et al. | |
| 7,500,060 B1 | 3/2009 | Anderson et al. | |
| 7,506,298 B1 | 3/2009 | Ingoldby | |
| 7,509,617 B1 | 3/2009 | Young et al. | |
| 7,518,396 B1 | 4/2009 | Kondapalli et al. | |
| 7,521,961 B1 | 4/2009 | Anderson | |
| 7,546,572 B1 | 6/2009 | Ballagh et al. | |
| 7,574,680 B1 | 8/2009 | Kulkarni et al. | |
| 7,576,561 B1 | 8/2009 | Huang | |
| 7,619,442 B1 | 11/2009 | Mason et al. | |
| 7,640,527 B1 | 12/2009 | Dorairaj et al. | |
| 7,650,248 B1 | 1/2010 | Baxter | |
| 7,653,820 B1 | 1/2010 | Trimberger | |
| 7,689,726 B1 | 3/2010 | Sundararajan et al. | |
| 7,724,815 B1 | 5/2010 | Raha et al. | |
| 7,746,099 B1 | 6/2010 | Chan et al. | |
| 7,788,625 B1 | 8/2010 | Donlin et al. | |
| 7,831,801 B1 | 11/2010 | Anderson | |
| 8,006,021 B1 | 8/2011 | Li et al. | |
| 8,010,924 B1* | 8/2011 | Slonim | G06F 30/34 |
| | | | 716/116 |
| 8,020,163 B2 | 9/2011 | Nolle, I et al. | |
| 8,045,546 B1 | 10/2011 | Bao et al. | |
| 8,102,188 B1 | 1/2012 | Chan et al. | |
| 8,122,396 B1 | 2/2012 | Antwerpen | |
| 8,214,694 B1 | 7/2012 | McKechnie et al. | |
| 8,250,342 B1 | 8/2012 | Kostamov et al. | |
| 8,359,448 B1 | 1/2013 | Neuendorffer | |
| 8,370,776 B1 | 2/2013 | Chan | |
| 8,415,974 B1 | 4/2013 | Lysaght | |
| 8,689,156 B2* | 4/2014 | Huggett | G06F 30/34 |
| | | | 716/110 |
| 8,719,750 B1 | 5/2014 | Balzli, Jr. | |
| 8,719,808 B1 | 5/2014 | Prinzing | |
| 8,796,539 B2 | 8/2014 | Asaumi et al. | |
| 8,928,351 B1 | 1/2015 | Konduru | |
| 9,081,634 B1 | 7/2015 | Simkins et al. | |
| 9,152,794 B1 | 10/2015 | Sanders et al. | |
| 9,165,143 B1 | 10/2015 | Sanders et al. | |
| 9,218,443 B1 | 12/2015 | Styles et al. | |
| 9,230,112 B1 | 1/2016 | Peterson et al. | |
| 9,323,876 B1 | 4/2016 | Lysaght et al. | |
| 9,336,010 B2 | 5/2016 | Kochar et al. | |
| 9,411,688 B1 | 8/2016 | Poolla et al. | |
| 9,436,785 B1 | 9/2016 | Javre | |
| 9,578,099 B2 | 2/2017 | Llorca et al. | |
| 9,652,252 B1 | 5/2017 | Kochar et al. | |
| 9,652,410 B1 | 5/2017 | Schelle et al. | |
| 10,243,882 B1 | 3/2019 | Swarbrick | |
| 10,628,622 B1* | 4/2020 | Sivaraman | G06F 30/34 |
| 10,853,541 B1* | 12/2020 | Joshi | G06F 30/331 |
| 2004/0114609 A1 | 6/2004 | Swarbrick et al. | |
| 2004/0210695 A1 | 10/2004 | Weber et al. | |
| 2007/0006137 A1 | 1/2007 | Savagaonkar | |
| 2008/0082759 A1 | 4/2008 | Pong | |
| 2008/0140980 A1* | 6/2008 | Mei | G06F 12/0851 |
| | | | 711/170 |
| 2008/0320255 A1 | 12/2008 | Wingard et al. | |
| 2008/0320268 A1 | 12/2008 | Wingard et al. | |
| 2009/0070728 A1 | 3/2009 | Solomon | |
| 2010/0322237 A1 | 12/2010 | Raja et al. | |
| 2012/0036296 A1 | 2/2012 | Wingard et al. | |
| 2012/0284501 A1 | 11/2012 | Zievers | |
| 2012/0310983 A1 | 12/2012 | Mittal | |
| 2013/0346953 A1 | 12/2013 | Chen | |
| 2014/0115195 A1* | 4/2014 | Higham | G06F 13/28 |
| | | | 710/22 |
| 2015/0109024 A1 | 4/2015 | Abdelfattah et al. | |
| 2017/0140800 A1 | 5/2017 | Wingard et al. | |
| 2017/0195258 A1 | 7/2017 | Wang et al. | |
| 2017/0220499 A1 | 8/2017 | Gray | |
| 2017/0315944 A1 | 11/2017 | Mayer et al. | |
| 2019/0238453 A1 | 8/2019 | Swarbrick et al. | |
| 2019/0266125 A1 | 8/2019 | Swarbrick et al. | |
| 2019/0303033 A1 | 10/2019 | Noguera Serra et al. | |
| 2019/0303311 A1 | 10/2019 | Bilski et al. | |
| 2019/0303323 A1 | 10/2019 | Swarbrick et al. | |
| 2019/0303328 A1 | 10/2019 | Bilski et al. | |

FOREIGN PATENT DOCUMENTS

| | | | | |
|---|---|---|---|---|
| EP | 0910027 A2 | | 10/1998 | |
| KR | 101541534 B1 | * | 8/2015 | |
| WO | WO-2018034681 A | * | 2/2018 | G06F 9/3834 |

OTHER PUBLICATIONS

English translation of CN-105681153-A (Year: 2016).*

English translation of CN-101650698-A (Year: 2009).*

Mefenza Michael et al: "Framework for rapid prototyping of embedded vision applications", Proceedings of the 2014 Conference on Design and Architectures for Signal and Image Processing, European Electronic Chips & Systems Design Initiat, Oct. 8, 2014 (Oct. 8, 2014), pp. 1-8, XP032781101, DOI: 10.1 109/DASIP . 2014.7115621 [retrieved on May 29, 2015] section III; figures 1, 2.

Xilinx: "Xilinx Zynq-7000 SoC", Jul. 29, 2014 (Jul. 29, 2014), pp. 1-8, XP055718465, Retrieved from the Internet: URL: https://www.xilinx.com/publications/prod_mktg/zynq-7000-generation-ahead-backgrounder.pdf [retrieved on Jul. 28, 2020] the whole document.

Kees Goossens et al: "A Design Flow for Application-Specific Networks on Chip with Guaranteed Performance to Accelerate SOC Design and Verification", Design, Automation, and Test in Europe Conference and Exhibition. Proceedings, IEEE Computer Society, US, Mar. 7, 2005 (Mar. 7, 2005), pp. 1182-1187, XP058405536, ISSN : 1530-1591, DOI: 10.1109/DATE.2005.11 ISBN: 978-0-7695-2288-3 sections 2, 3.

Xilinx, "Versal Architecture and Product Data Sheet: Overview," DS950 (v1.0), Oct. 2, 2018, 23 pg., Xilinx, Inc., San Jose, California, USA.

Xilinx, "Versal: The First Adaptive Compute Acceleration Platform (ACAP)," WP505 (v1.0), Oct. 2, 2018, 21 pg., Xilinx, Inc., San Jose, California, USA.

Xilinx, "SDAccel Development Environment User Guide," UG1023 (v.2015.1), Sep. 15, 2015, 95 pg., Xilinx, Inc., San Jose, California, USA.

Xilinx, "Xilinx AI Engines and Their Applications," WP506 (v1.0. 2), Oct. 3, 2018, 13 pg., Xilinx, Inc., San Jose, California, USA.

Xilinx, "Xilinx Unveils Revolutionary Adaptable Computing Product Category", Mar. 19, 2018, 3 pg., Xilinx, Inc., San Jose, California, USA <https://www.xilinx.com/news/press/2018/xilinx-unveils-revolutionary-adaptable-computing-product-category.html>.

Bokhari, S.H., "On the mapping problem," IEEE Transactions on Computers, Mar. 1981, vol. 1, No. 3, pp. 207-214.

Arm Limited, "AMBA 3 APB Protocol Specification," v1.0, Sep. 25, 2003, pp. 1-34, ARM Limited, Cambridge, UK.

Arm Limited, "AMBA 4 Axis-Stream Protocol SpecificaTlon," V1.0, Mar. 3, 2010, pp. 1-42, ARM Limited, Cambridge UK.

Bilski et al., "Device With Data Processing Engine Array", U.S. Appl. No. 15/944,307, filed Apr. 3, 2018, 123 pages, Xilinx, Inc., San Jose, CA, USA.

(56) References Cited

OTHER PUBLICATIONS

Xilinx, Inc., PCT International Application No. PCT/US2019/025414, Invitation to Pay Additional Fees, Communication Relating to the Results of The Partial International Search, and Provisional Opinion Accompanying the Partial Search Result, Jul. 5, 2019, 12 pg.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersjey, USA.

Doud, B., "Accelerating the Data Plane With the Tile-MX Manycore Processor," Feb. 25, 2015, 19 pp., Linley Data Center Conference, EZChip Semiconductor, Inc., San Jose, California, USA.

Mellanox, EZChip, "Tile-Gx72 Processor," PB041, Feb. 14, 2015, 2 pp., EZchip Semiconductor, Inc., San Jose, California, USA.

Glass, Christopher et al., "The Turn Model for Adaptive Routing," Journal of the Association for Computing Machinery, Sep. 1994, pp. 874,902, vol. 41, No. 5, ACM, New York, New York, USA.

Kalray, "Deep Learning for High-Performance Embedded Applications," 19 pp., Kalray Inc., Los Altos, California, USA.

Kalray, "Kalray NVMe-oF Target Controller Solutions," Dec. 18, 20 17, 14 pp., Kalray Inc., Los Altos, California, USA.

Kalray, "MPPA Processors for Autonomous Driving," May 25, 2017, 18 pp., Kalray Inc., Los Altos, California, USA.

Mellanox, "BlueField Multicore System on Chip," copyright 2017, 4 pp., Mellanox Technologies, Sunnyvale, California, USA.

Mellanox, "NP-5 Network Processor," copyright 2017, 2 pp., Mellanox Technologies, Sunnyvale, California, USA.

ARM Limited, "AMBA AXI and ACE Protocol Specification," Jun. 16, 2003, pp. 1-306, ARM Limited, Cambridge, UK.

Noguera, J.J. et al., "Data Processing Engine Arrangement in a Device," U.S. Appl. No. 15/944,160, filed Apr. 3, 2018, 125 pg., Xilinx, Inc., San Jose, California, USA.

Rantala, Ville et al., "Network on Chip R outing Algorithms," TUGS Technical Report No. 779, Aug. 2006, pp. 1-38, Turku Centre for Computer Science, Turku, Finland.

Schooler, Richard, "Tile Processors: Many-Core for Embedded and Cloud Computing," Sep. 15, 2010, 35 pp., 14th Annual Workshop on High Performance Embedded Computing (HPEC '10).

Swarbrick et al., "End-to-End Quality-of-Service in a Network-on-Chip," U.S. Appl. No. 15/886,583, filed Feb. 1, 2018, Xilinx, Inc., San Jose, CA, USA.

Swarbrick et al., "Configurable Network-on-Chip for a Programmable Device", U.S. Appl. No. 16/041,473, filed Jul. 20, 2018, 34 pages, Xilinx, Inc., San Jose, CA, USA.

Swarbrick, et al., "Peripheral Interconnect for Configurable Slave Endpoint Circuits," U.S. Appl. No. 15/936,916, filed Jul. 20, 2018, 42 pg., Xilinx, Inc., San Jose, CA, USA.

Swarbrick, et al., "ECC Proxy Extension and Byte Organization for Multi-Master Systems," U.S. Appl. No. 16/106,691, filed Aug. 21, 2018, 31 pg., Xilinx, Inc., San Jose, CA, USA.

Swarbrick, et al., "Flexible Address Mapping for a NOC in an Integrated Circuit ," U.S. Appl. No. 15/964,901, filed Apr. 27, 2018, 28 pg., Xilinx, Inc., San Jose, CA, USA.

Swarbrick, et al., "Multi-Chip Structure Having Configurable Network-on-Chip ," U.S. Appl. No. 15/990,506, filed May 25, 2018, 33 pg., Xilinx, Inc., San Jose, CA, USA.

Swarbrick, et al., "Programmable NOC Compatible With Multiple Interface Communication Protocol," U.S. Appl. No. 15/904,211, filed Feb. 23, 2018, 27 pg., Xilinx, Inc., San Jose, CA, USA.

TIS Committee, "Tool Interface Standard (TIS) Executable and Linking Format (ELF) Specification," Version 1.2, May 1995, 106 pg, Tool Interface Standard Committee.

Wentzlahh, David, et al., "On-Chip Interconnection Architecture of the Tile Processor," IEEE Micro, Nov. 12, 2007, pp. 15-31, vol. 27, Issue 5, IEEE Computer Society Press, Los Alamitos, California, USA.

Xilinx, Inc., PCT International Application No. PCT/US2019/025115, International Search Report and Written Opinion, dated Jun. 28, 2019, 16 pg.

Xilinx, "UltraScale Architecture DSP Slice," UG579, Oct. 18, 2017, 74 pp., Xilinx, Inc., San Jose, California, USA.

Xilinx, Inc., "AXI4-Stream Interconnect v1.1, LogiCORE IP Product Guide," PG035, Vivado Design Suite,Chap. 2: Product Specification, Chap. 3: Designing With the Core, Oct. 4, 2017, 44 pg., Xilinx, Inc., San Jose, California, USA.

Xilinx, Inc., "Zynq-7000 AP SoC—32 Bit DDR Access with ECC Tech Tip," 15 pg., printed on Aug. 10, 2018, <http://www.wiki.xilinx.com/Zynq-7000+AP+XoC++32+Bit+DDR+Access+with+ECC+Tech+Tip>, San Jose, CA, USA.

EZChip, "Tile-Gx72 Processor," Feb. 14, 2015, 2 pp., EZchip Semiconductor, Inc., San Jose, California, USA.

Kees Vissers: "Versal : New Xilinx Adaptive Compute Acceleration Platforms", Nov. 5, 2018 (Nov. 5, 2018), XP054980700, Retrieved from the Internet: URL:https://www.youtube.com/watch?v=aiPJij3ifvgv [retrieved on Jul. 16, 2020] the whole document.

Kia Bazargan et al.: Xilinx Adaptive Compute Acceleration Platform : Versal TM Architecture, Proceedings of The 2019 ACM/SIGDA International Symposium on Field-Programmable Gate Arrays , FPGA 19, Feb. 20, 2019 (Feb. 20, 2019), pp. 84-93, XP055715259, New York, New York, USA DOI: 10.1145/3289602.3293906 ISBN: 978-1-4503-6137-8 the whole document.

Juanjo Noguera: "HW/SW Programmable Engine: Domain Specific Architecture for Project Everest", HotChips 30 (2018), Aug. 21, 2018 (Aug. 21, 2018), XP055715263, Retrieved from the Internet: URL:https://www.hotchips.org/hc30/2conf/2.03_Xilinx_Juanjo_XilinxSWPEHotChips20180819.pdf [retrieved on Jul. 15, 2020] the whole document.

* cited by examiner

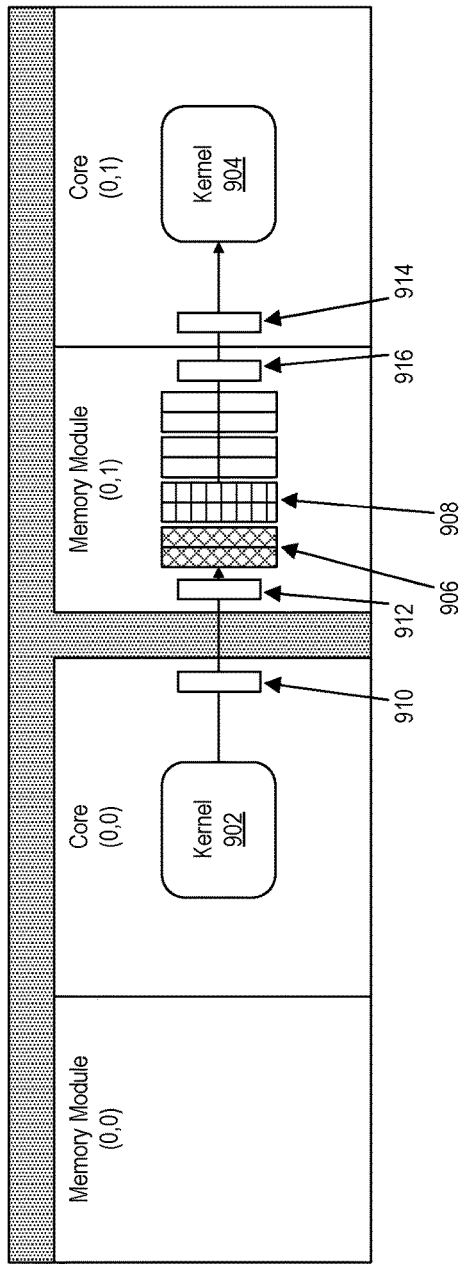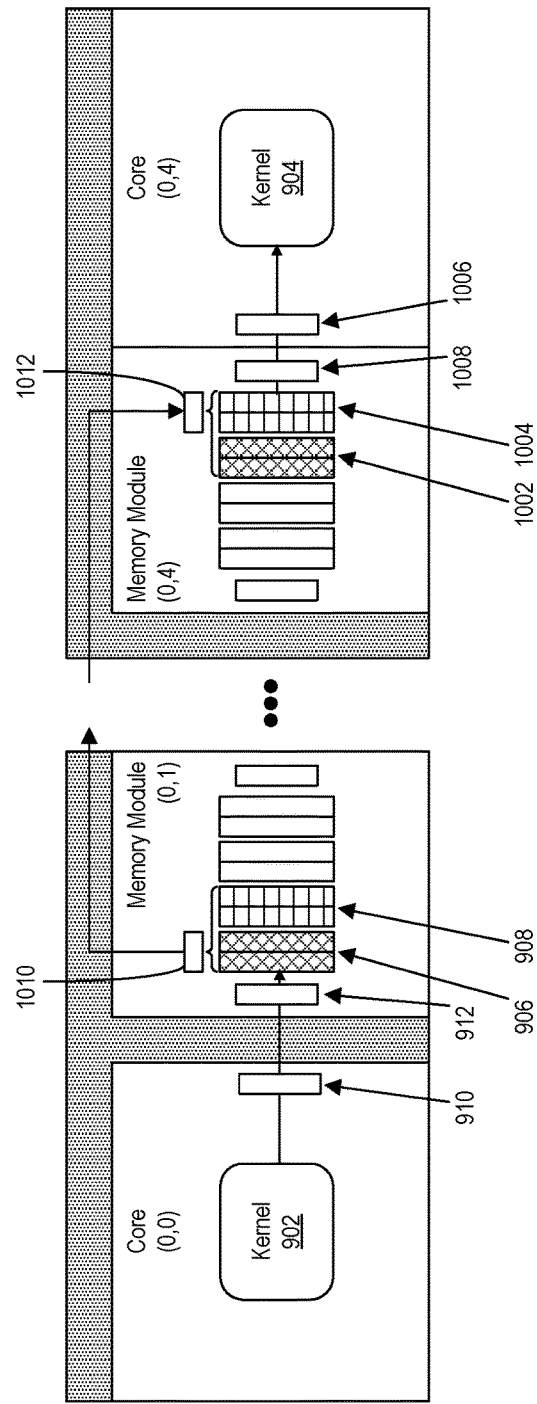

IMPLEMENTING AN APPLICATION SPECIFIED AS A DATA FLOW GRAPH IN AN ARRAY OF DATA PROCESSING ENGINES

TECHNICAL FIELD

This disclosure relates to integrated circuits (ICs) and, more particularly, to implementing an application using a plurality of data processing engines of an IC.

BACKGROUND

A processor array refers to a plurality of processing elements. The processing elements may be arranged in a grid-like pattern. An application that is to be implemented using the processor array typically includes different software modules. These different software modules are intended to execute in parallel on the processing elements of the processor array. To implement the application using the processor array, these different software modules must be assigned to the various processing elements of the processor array. Once assigned to particular processing elements, the software modules may be compiled for execution.

SUMMARY

In one aspect, a method may include, in a first pass, mapping, using computer hardware, a data flow graph (DFG) onto an array of DPEs by minimizing direct memory access (DMA) circuit usage and memory conflicts in the array of DPEs and, in response to determining that a mapping solution generated by the first pass requires an additional DMA engine not specified by the DFG, inserting, using the computer hardware, additional buffers into the DFG. The method may include, in a second pass, mapping, using the computer hardware, the additional buffers onto the array of DPEs by minimizing the memory conflicts in the array of DPEs.

In another aspect, a system includes a processor configured to initiate operations. The operations may include, in a first pass, mapping a DFG onto an array of DPEs by minimizing DMA engine usage and memory conflicts in the array of DPEs and, in response to determining that a mapping solution generated by the first pass requires an additional DMA engine not specified by the DFG, inserting additional buffers into the DFG. The processor may be configured to perform additional operations including, in a second pass, mapping the additional buffers onto the array of DPEs by minimizing the memory conflicts in the array of DPEs.

In another aspect, a method may include receiving, using computer hardware, a DFG specifying a plurality of nodes connected by a plurality of arcs, wherein the nodes represent kernels and the arcs represent buffers used by the kernels, generating, using the computer hardware, an integer linear programming (ILP) formulation from the data flow graph, wherein the ILP formulation includes a plurality of variables and constraints for mapping the DFG onto an array of DPEs, and determining, using the computer hardware, a mapping of the nodes to cores within the array of DPEs and the arcs to memory modules within the array of DPEs that solves the ILP formulation while minimizing one or more cost functions.

In one or more embodiments, a computer program product includes a computer readable storage medium having program code stored thereon. The program code is executable by a processor to perform the operations described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 9 illustrates additional example memory accesses within a DPE array that do not require DMA engines.

FIG. 10 illustrates additional example memory accesses within a DPE array that require DMA engines.

DETAILED DESCRIPTION

Figure 1:
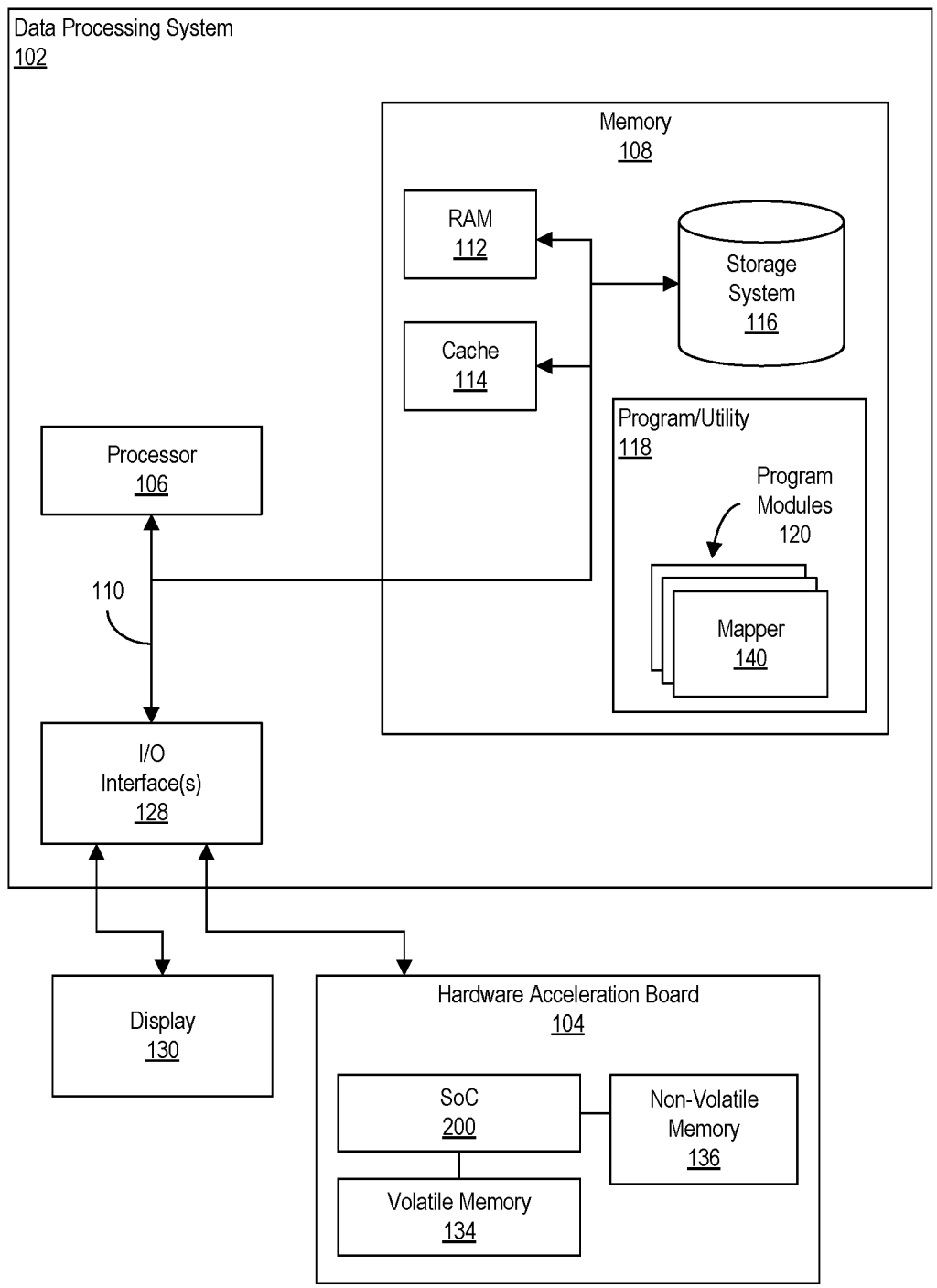
FIG. 1 illustrates an example of a computing environment for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing an application using a plurality of data processing engines (DPEs) of an IC. The plurality of DPEs may be arranged in an array (e.g., a "DPE array"). As defined within this disclosure, a DPE is a hardwired and programmable circuit block that includes a core capable of executing program code and a memory module coupled to the core. The DPEs are capable of communicating with one another as described in greater detail within this disclosure. To the extent the IC includes other subsystems, the DPEs are also capable of communicating with such other subsystems.

In accordance with the inventive arrangements described within this disclosure, a system is capable of mapping an application intended for implementation using the DPE array onto the various DPEs in the DPE array. The application may be specified as a data flow graph (DFG). The DFG is formed of nodes and arcs corresponding to kernels (e.g., software functions) and buffers, respectively. The arcs connect the nodes of the DFG. The system is capable of allocating or mapping the nodes and arcs onto particular cores and memory modules of the individual DPEs of the DPE array. The allocation of the DFG to the DPE array complies with any architectural constraints of the device that includes the DPE array and any constraints imposed by the DFG itself.

In one aspect, the system is capable of performing the mapping based on one or more cost functions. The cost function(s) may take into account one or more different criteria. For example, cost function(s) may be formulated to minimize data movements in the DPE array, memory conflicts in the DPE array, and/or latency in the DPE array. Given the architecture of the DPE array having distributed memories for the cores, reduction or minimization of data movement and memory conflicts, as cost function criteria, are not considered in other conventional techniques for implementing applications in processor arrays. In cases where an Electronic Design Automation (EDA) system places circuit designs to particular locations in an IC (e.g., to resources of a programmable IC), such techniques largely attempt to minimize distance between connected circuit components for timing purposes. These types of placement techniques do not consider criteria such as data movement or memory conflicts.

In another aspect, the system is capable of implementing the DFG using a two pass technique. In a first pass, the system attempts to map the DFG onto the DPE array. The first pass may or may not succeed. In cases where the first pass does succeed, but requires one or more additional buffers for implementation, the system is capable of performing a second pass. The system is capable of including the additional buffers in the application. In the second pass, the system maps the additional buffers, represented as arcs in the DFG, to memory modules of the DPE array.

In still another aspect, the system is capable of performing the mapping by generating an Integer Linear Programming (ILP) formulation of the mapping problem. The ILP formulation may include a plurality of different variables and constraints that define the mapping problem. The system is capable of solving the ILP formulation while also minimizing the cost(s). In this manner, the system is capable of mapping the DFG onto the DPE array. The system may use ILP in performing both the first pass and the second pass.

In still another aspect, the system is capable of performing the mapping by using one or more heuristics. For example, the system is capable of using one or more heuristics to place nodes of the DFG based, at least in part, on affinity and validity. If a node is placed with all constraints for the node being met, the system is capable of then placing neighboring nodes of the placed node so that such nodes are handled next. In cases where a valid placement for a current node is not available, the system may unplace one or more placed nodes from their best candidate DPE(s) to make room for this node.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a computing environment 100. Computing environment 100 may include a data processing system (system) 102 and a hardware acceleration board 104. Computing environment 100 is only one example implementation of a computing environment that may be used with a hardware acceleration board. In this regard, computing environment 100 may be used in a standalone capacity, as a bare metal server, as part of a computing cluster, or within a cloud computing environment. FIG. 1 is not intended to suggest any limitation as to the scope of use or functionality of the examples described herein. Computing environment 100 is an example of a system and/or computer hardware that is capable of performing the various operations described within this disclosure relating to implementing an application, e.g., a DFG, within a DPE array as implemented within an SoC 200. For example, computing environment 100 may be used to implement an EDA system.

System 102 is operational with numerous other general-purpose or special-purpose computing system environments or configurations. Examples of computing systems, environments, and/or configurations that may be suitable for use with system 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As illustrated, system 102 is shown in the form of a computing device, e.g., a computer or server. System 102 can be practiced as a standalone device, in a cluster, or in a distributed cloud computing environment where tasks are performed by remote processing devices that are linked through a communications network. In a distributed cloud computing environment, program modules may be located in both local and remote computer system storage media including memory storage devices. The components of system 102 may include, but are not limited to, one or more processors 106 (e.g., central processing units), a memory 108, and a bus 110 that couples various system components including memory 108 to processor 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Extended ISA (EISA) bus, Video Electronics Standards Association (VESA) local bus, Peripheral Component Interconnect (PCI) bus, and PCI Express (PCIe) bus.

System 102 typically includes a variety of computer readable media. Such media may be any available media that is accessible by system 102 and may include any combination of volatile media, non-volatile media, removable media, and/or non-removable media.

Memory 108 may include computer readable media in the form of volatile memory, such as random-access memory (RAM) 112 and/or cache memory 114. System 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

Program/utility 118, having a set (at least one) of program modules 120, may be stored in memory 108 by way of example, and not limitation, as well as an operating system, one or more application programs, other program modules, and program data. Program modules 120 generally carry out the functions and/or methodologies of embodiments of the invention as described herein. For example, program modules 120 may include one or more applications and a driver or daemon for communicating with hardware acceleration board 104 and/or SoC 200. In an example implementation, program modules 120 may include a mapper 140 that, when executed, is capable of mapping a DFG representing an application onto an array of DPEs as described within this disclosure in greater detail below.

Program/utility 118 is executable by processor 106. Program/utility 118 and any data items used, generated, and/or operated upon by processor 106 are functional data structures that impart functionality when employed by processor 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

System 102 may include one or more Input/Output (I/O) interfaces 128 communicatively linked to bus 110. I/O interface(s) 128 allow system 102 to communicate with external devices, couple to external devices that allow user(s) to interact with system 102, couple to external devices that allow system 102 to communicate with other computing devices, and the like. For example, system 102 may be communicatively linked to a display 130 and to hardware acceleration board 104 through I/O interface(s) 128. System 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, I/O interface 128 through which system 102 communicates with hardware acceleration board 104 is a PCIe adapter. Hardware acceleration board 104 may be implemented as a circuit board, e.g., a card, that couples to system 102. Hardware acceleration board 104 may, for example, be inserted into a card slot, e.g., an available bus and/or PCIe slot of system 102.

Hardware acceleration board 104 includes an SoC 200. SoC 200 includes a DPE array. In another aspect, SoC 200 may include one or more other subsystems in addition to the DPE array. For example, SoC 200 may include programmable logic (PL). An example architecture for the SoC 200 is described in greater detail in connection with FIG. 2. Hardware acceleration board 104 also includes volatile memory 134 coupled to SoC 200 and a non-volatile memory 136 also coupled to the SoC 200. Volatile memory 134 may be implemented as a RAM and is considered a "local memory" of SoC 200, whereas memory 108, being within system 102, is not considered local to SoC 200, but rather local to system 102. In some implementations, volatile memory 134 may include multiple gigabytes of RAM, e.g., 64 GB of RAM. An example of non-volatile memory 136 includes flash memory.

In the example of FIG. 1, computing environment 100 is capable of operating on an application for SoC 200 and implementing the application within SoC 200. The application may be specified as a DFG that is to be implemented using the DPE array of SoC 200. In general, system 102 is capable of mapping the application onto the SoC 200 for execution by the SoC 200.

Figure 2:
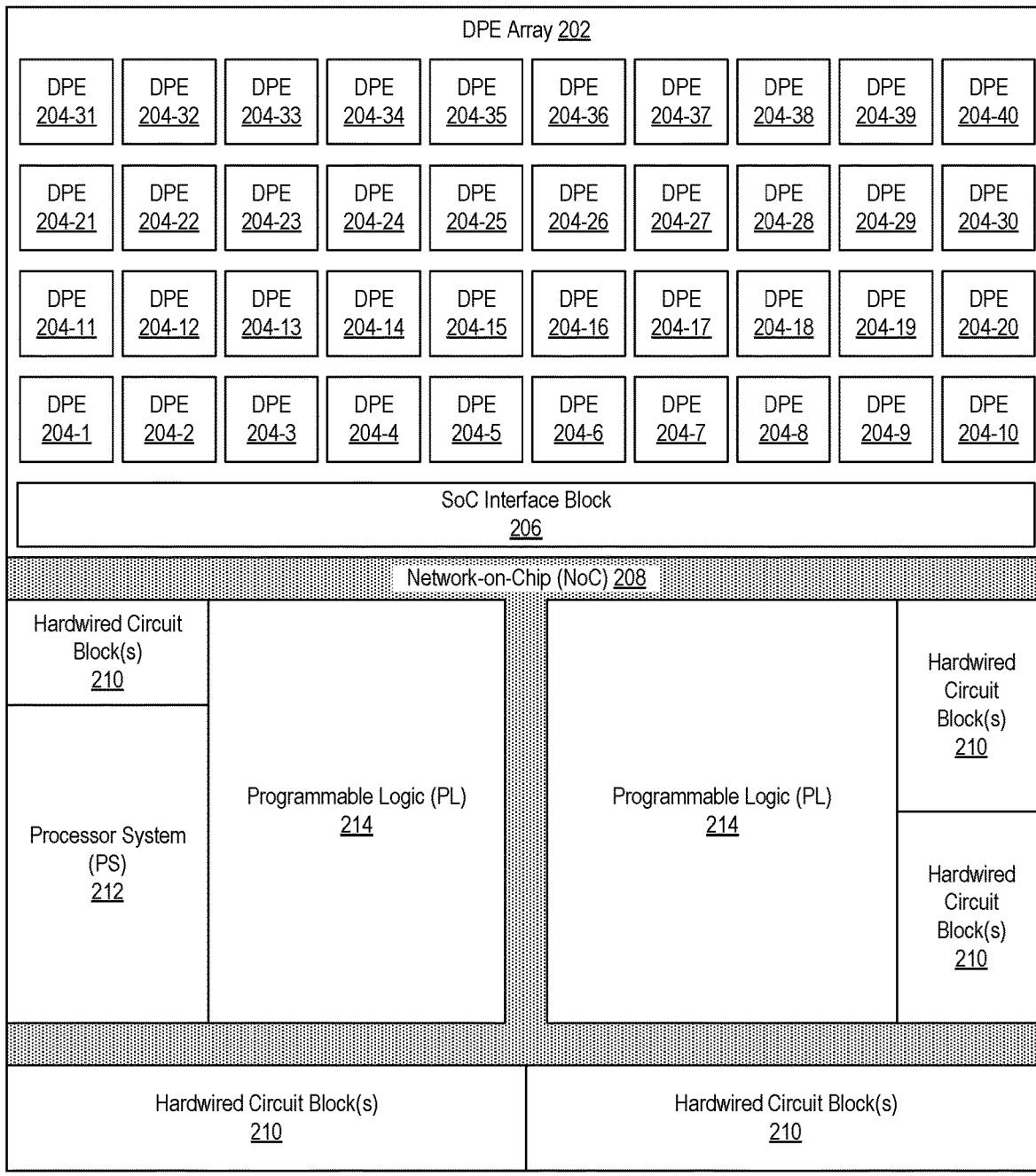
FIG. 2 illustrates an example architecture for a System-on-Chip (SoC) type of integrated circuit (IC).

FIG. 2 illustrates an example architecture for SoC 200. SoC 200 is an example of a programmable IC. In the example of FIG. 2, the various, different subsystems or regions of the SoC 200 illustrated may be implemented on a single die provided within a single integrated package. In other examples, the different subsystems may be implemented on a plurality of interconnected dies provided as a single, integrated package.

In the example, the SoC 200 includes a plurality of regions having circuitry with different functionalities. In the example, the SoC 200 includes a DPE array 202. SoC 200 includes PL 214 (e.g., shown as two different PL regions), a processing system (PS) 212, a Network-on-Chip (NoC) 208, and one or more hardwired circuit blocks 210. DPE array 202 is implemented as a plurality of interconnected, hardwired, and programmable processors having an interface to the other regions of the SoC 200.

PL 214 is circuitry that may be programmed to perform specified functions. As an example, PL 214 may be implemented as field programmable gate array type circuitry. PL 214 can include an array of programmable circuit blocks. Examples of programmable circuit blocks within PL 214 include, but are not limited to, configurable logic blocks (CLBs), dedicated random access memory blocks (BRAM and/or UltraRAM or URAM), digital signal processing blocks (DSPs), clock managers, and/or delay lock loops (DLLs).

Each programmable circuit block within PL 214 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries, collectively referred to as PL 214, may be programmed by loading configuration data into internal configuration memory cells that define how the programmable elements are configured and operate.

PS 212 is implemented as hardwired circuitry that is fabricated as part of SoC 200. PS 212 may be implemented as, or include, any of a variety of different processor types each capable of executing program code. For example, PS 212 may be implemented as an individual processor, e.g., a single core capable of executing program code. In another example, PS 212 may be implemented as a multi-core processor. In still another example, PS 212 may include one or more cores, modules, co-processors, interfaces, and/or other resources. PS 212 may be implemented using any of a variety of different types of architectures. Example architectures that may be used to implement PS 212 may include, but are not limited to, an ARM processor architecture, an x86 processor architecture, a GPU architecture, a mobile processor architecture, a DSP architecture, other suitable architectures capable of executing computer-readable instructions or program code, and/or a combination of different processors and/or processor architectures.

NoC 208 includes an interconnecting network for sharing data between endpoint circuits in SoC 200. The endpoint circuits can be disposed in DPE array 202, PL regions 214, PS 212, and/or in hardwired circuit blocks 210. NoC 208 can include high-speed data paths with dedicated switching. In an example, NoC 208 includes horizontal paths, vertical paths, or both horizontal and vertical paths. The arrangement and number of regions shown in FIG. 1 is merely an example. The NoC 208 is an example of the common infrastructure that is available within the SoC 200 to connect selected components and/or subsystems.

NoC 208 provides connectivity to PL 214, PS 212, and to selected ones of the hardwired circuit blocks 210. NoC 208 is programmable. In the case of a programmable NoC used with other programmable circuitry, the nets and/or data transfers that are to be routed through NoC 208 are unknown until a user circuit design is created for implementation within the SoC 200. NoC 208 may be programmed by loading configuration data into internal configuration registers that define how elements within NoC 208 such as switches and interfaces are configured and operate to pass data from switch to switch and among the NoC interfaces.

NoC 208 is fabricated as part of the SoC 200 and while not physically modifiable, may be programmed to establish connectivity between different master circuits and different slave circuits of a user circuit design. NoC 208, for example, may include a plurality of programmable switches that are capable of establishing a packet switched network connecting user specified master circuits and slave circuits. In this regard, NoC 208 is capable of adapting to different circuit designs, where each different circuit design has different combinations of master circuits and slave circuits implemented at different locations in the SoC 200 that may be coupled by NoC 208. NoC 208 may be programmed to route data, e.g., application data and/or configuration data, among the master and slave circuits of the user circuit design. For example, NoC 208 may be programmed to couple different user-specified circuitry implemented within PL 214 with PS 212, and/or DPE array 202, with different hardwired circuit blocks 210, and/or with different circuits and/or systems external to the SoC 200.

The hardwired circuit blocks 210 may include input/output (I/O) blocks, and/or transceivers for sending and receiving signals to circuits and/or systems external to SoC 200, memory controllers, or the like. Examples of different I/O blocks may include single-ended and pseudo differential I/Os and high-speed differentially clocked transceivers. Further, hardwired circuit blocks 210 may be implemented to perform specific functions. Additional examples of hardwired circuit blocks 210 include, but are not limited to, cryptographic engines, digital-to-analog converters, analog-to-digital converters, and the like. Hardwired circuit blocks 210 within SoC 200 may be referred to herein from time-to-time as application-specific blocks.

In the example of FIG. 2, PL 214 is shown in two separate regions. In another example, PL 214 may be implemented as a unified region of programmable circuitry. In still another example, PL 214 may be implemented as more than two different regions of programmable circuitry. The particular organization of PL 214 is not intended as a limitation. In this regard, SoC 200 includes one or more PL regions 214, PS 212, and NoC 208.

In other example implementations, SoC 200 may include two or more DPE arrays 202 located in different regions of the IC. In still other examples, SoC 200 may be implemented as a multi-die IC. In that case, each subsystem may be implemented on a different die. The different dies may be communicatively linked using any of a variety of available multi-die IC technologies such stacking the dies side-by-side on an interposer, using a stacked-die architecture where the IC is implemented as a Multi-Chip Module (MCM), or the like. In the multi-die IC example, it should be appreciated that each die may include single subsystem, two or more subsystems, a subsystem and another partial subsystem, or any combination thereof.

DPE array 202 is implemented as a two-dimensional array of DPEs 204 that includes SoC interface block 206. DPE array 202 may be implemented using any of a variety of different architectures to be described herein in greater detail below. For purposes of illustration and not limitation, FIG. 2 illustrates DPEs 204 arranged in aligned rows and aligned columns. In other embodiments, however, DPEs 204 may be arranged where DPEs in selected rows and/or columns are horizontally inverted or flipped relative to DPEs in adjacent rows and/or columns. In one or more other embodiments, rows and/or columns of DPEs may be offset relative to adjacent rows and/or columns. One or more or all DPEs 204 may be implemented to include one or more cores each capable of executing program code. The number of DPEs 204, particular arrangement of DPEs 204, and/or orientation of DPEs 204 is not intended to be limiting.

SoC interface block 206 is capable of coupling DPEs 204 to one or more other subsystems of SoC 200. In one or more embodiments, SoC interface block 206 is coupled to adjacent DPEs 204. For example, SoC interface block 206 may be directly coupled to each DPE 204 in the bottom row of DPEs in DPE array 202. In illustration, SoC interface block 206 may be directly connected to DPE 204-1, DPE 204-2, DPE 204-3, DPE 204-4, DPE 204-5, DPE 204-6, DPE 204-7, DPE 204-8, DPE 204-9, and DPE 204-10.

FIG. 2 is provided for purposes of illustration. In other embodiments, SoC interface block 206 may be located at the top of DPE array 202, to the left of DPE array 202 (e.g., as a column), to the right of DPE array 202 (e.g., as a column), or at multiple locations in and around DPE array 202 (e.g., as one or more intervening rows and/or columns within DPE array 202). Depending on the layout and location of SoC interface block 206, the particular DPEs coupled to SoC interface block 206 may vary.

For purposes of illustration, if SoC interface block 206 is located to the left of DPEs 204, SoC interface block 206 may be directly coupled to the left column of DPEs including DPE 204-1, DPE 204-11, DPE 204-21, and DPE 204-31. If SoC interface block 206 is located to the right of DPEs 204, SoC interface block 206 may be directly coupled to the right column of DPEs including DPE 204-10, DPE 204-20, DPE 204-30, and DPE 204-40. If SoC interface block 206 is located at the top of DPEs 204, SoC interface block 206 may be coupled to the top row of DPEs including DPE 204-31, DPE 204-32, DPE 204-33, DPE 204-34, DPE 204-35, DPE 204-36, DPE 204-37, DPE 204-38, DPE 204-39, and DPE 204-40. If SoC interface block 206 is located at multiple locations, the particular DPEs that are directly connected to SoC interface block 206 may vary. For example, if SoC interface block 206 is implemented as a row and/or column within DPE array 202, the DPEs that are directly coupled to SoC interface block 206 may be those that are adjacent to SoC interface block 206 on one or more or each side of SoC interface block 206.

DPEs 204 are interconnected by DPE interconnects (not shown), which, when taken collectively, form a DPE interconnect network. As such, SoC interface block 206 is capable of communicating with any DPE 204 of DPE array 202 by communicating with one or more selected DPEs 204 of DPE array 202 directly connected to SoC interface block 206 and utilizing the DPE interconnect network formed of DPE interconnects implemented within each respective DPE 204.

SoC interface block 206 is capable of coupling each DPE 204 within DPE array 202 with one or more other subsystems of SoC 200. For example, SoC interface block 206 is capable of coupling to DPE array 202 to the NoC 208 and PL 214. As such, the DPE array 202 is capable of communicating with circuit blocks implemented in PL 214, the PS 212, and/or any of the hardwired circuit blocks 210. For example, SoC interface block 206 is capable of establishing connections between selected DPEs 204 and PL 214. SoC interface block 206 is also capable of establishing connections between selected DPEs 204 and NoC 208. Through NoC 208, the selected DPEs 204 are capable of communicating with PS 212 and/or hardwired circuit blocks 210. Selected DPEs 204 are capable of communicating with hardwired circuit blocks 210 via SoC interface block 206 and PL 214. In particular embodiments, SoC interface block 206 may be coupled directly to one or more subsystems of SoC 200. For example, SoC interface block 206 may be coupled directly to PS 212 and/or to hardwired circuit blocks 210.

In one or more embodiments, DPE array 202 includes a single clock domain. Other subsystems such as NoC 208, PL 214, PS 212, and the various hardwired circuit blocks 210 may be in one or more separate or different clock domain(s). Still, DPE array 202 may include additional clocks that may be used for interfacing with other ones of the subsystems. In particular embodiments, SoC interface block 206 includes a clock signal generator that is capable of generating one or more clock signals that may be provided or distributed to DPEs 204 of DPE array 202.

DPE array 202 may be programmed by loading configuration data into internal configuration memory cells (also referred to herein as "configuration registers") that define connectivity among DPEs 204 and SoC interface block 206 and how DPEs 204 and SoC interface block 206 operate. For example, for a particular DPE 204 or group of DPEs 204 to communicate with a subsystem, the DPE(s) 204 and SoC interface block 206 are programmed to do so. Similarly, for one or more particular DPEs 204 to communicate with one or more other DPEs 204, the DPEs are programmed to do so. DPE(s) 204 and SoC interface block 206 may be programmed by loading configuration data into configuration registers within DPE(s) 204 and SoC interface block 206, respectively. In another example, the clock signal generator, being part of SoC interface block 206, may be programmable using configuration data to vary the clock frequencies provided to DPE array 202.

It should be appreciated that SoC 200 is shown for purposes of illustration and not limitation. In other examples, DPE array 202 may be implemented in an IC that does not include other subsystems such as PL 214, PS 212, NoC 208, and/or hardwired circuit blocks 210. In that case, the IC may include I/O circuitry for receiving signals from external to the IC and sending signals to destinations external to the IC. The I/O circuitry may connect to SoC interface block 206. In still other examples, DPE array 202 may include one or more or any combination of the subsystems illustrated and/or other subsystems not described in connection with FIG. 2. The example techniques for implementing an application in DPE array 202 performed by system 102 may be performed regardless of the particular IC and/or architecture of the IC in which DPE array 202 is included.

Figure 3:
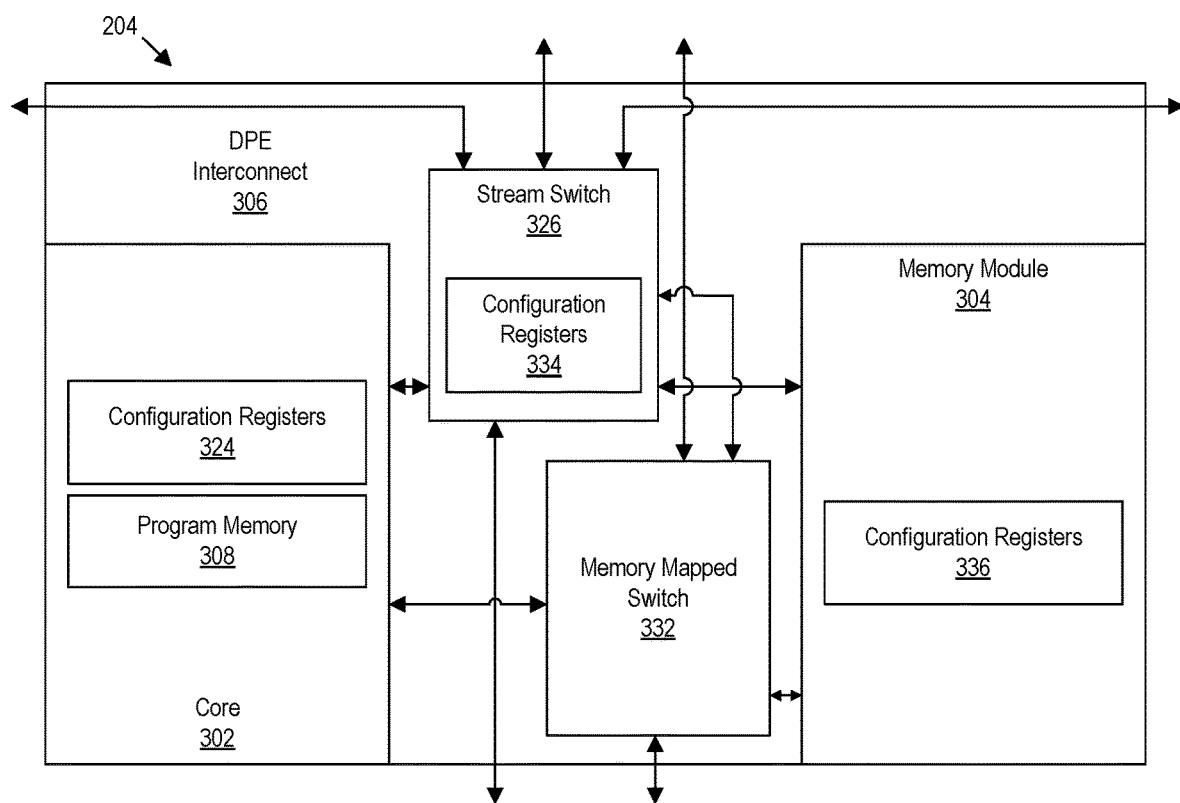
FIG. 3 illustrates an example architecture for a data processing engine (DPE) of the DPE array of FIG. 2.

FIG. 3 illustrates an example architecture for a DPE 204 of DPE array 202 of FIG. 2. In the example of FIG. 3, DPE 204 includes a core 302 (e.g., a single core or single processor), a memory module 304, and DPE interconnect 306. Each DPE 204 is implemented as a hardwired and programmable circuit block on the SoC 200.

Core 302 provides the data processing capabilities of DPE 204. Core 302 may be implemented as any of a variety of different processing circuits. In the example of FIG. 3, core 302 includes an optional program memory 308. In an example implementation, core 302 is implemented as a processor that is capable of executing program code, e.g., computer readable instructions. In that case, program memory 308 is included and is capable of storing instructions that are executed by core 302. Core 302, for example, may be implemented as a CPU, a GPU, a DSP, a vector processor, or other type of processor that is capable of executing instructions. Core 302 may be implemented using any of the various CPU and/or processor architectures described herein. In another example, core 302 is implemented as a very long instruction word (VLIW) vector processor or DSP.

In particular implementations, program memory 308 is implemented as a dedicated program memory that is private to core 302 (e.g., accessed exclusively by core 302). Program memory 308 may only be used by the core of the same DPE 204. Thus, program memory 308 may only be accessed by core 302 and is not shared with any other DPE or component of another DPE. Program memory 308 may include a single port for read and write operations. Program memory 308 may support program compression and is addressable using the memory mapped network portion of DPE interconnect 306 described in greater detail below. Via the memory mapped network of DPE interconnect 306, for example, program memory 308 may be loaded with program code that may be executed by core 302.

Core 302 may include configuration registers 324. Configuration registers 324 may be loaded with configuration data to control operation of core 302. In one or more embodiments, core 302 may be activated and/or deactivated based upon configuration data loaded into configuration registers 324. In the example of FIG. 3, configuration registers 324 are addressable (e.g., may be read and/or written) via the memory mapped network of DPE interconnect 306 described in greater detail below.

In one or more embodiments, memory module 304 is capable of storing data that is used by and/or generated by core 302. For example, memory module 304 is capable of storing application data. Memory module 304 may include a read/write memory such as a random-access memory (RAM). Accordingly, memory module 304 is capable of storing data that may be read and consumed by core 302. Memory module 304 is also capable of storing data (e.g., results) that are written by core 302.

In one or more other embodiments, memory module 304 is capable of storing data, e.g., application data, that may be used by and/or generated by one or more other cores of other DPEs within the DPE array. One or more other cores of DPEs may also read from and/or write to memory module 304. In particular embodiments, the other cores that may read from and/or write to memory module 304 may be cores of one or more neighboring DPEs. Another DPE that shares a border or boundary with DPE 204 (e.g., that is adjacent) is said to be a "neighboring" DPE relative to DPE 204. By allowing core 302 and one or more other cores from neighboring DPEs to read and/or write to memory module 304, memory module 304 implements a shared memory that supports communication among the different DPEs and/or cores capable of accessing memory module 304.

Referring to FIG. 2, for example, DPEs 204-14, 204-16, 204-5, and 204-25 are considered neighboring DPEs of DPE 204-15. In one example, the core within each of DPEs 204-16, 204-5, and 204-25 is capable of reading and writing to the memory module within DPE 204-15. In particular embodiments, only those neighboring DPEs that are adjacent to (e.g., have cores adjacent to) the memory module may access the memory module of DPE 204-15. For example, DPE 204-14, while adjacent to DPE 204-15, may not be adjacent to the memory module of DPE 204-15 since the core of DPE 204-15 may be located between the core of DPE 204-14 and the memory module of DPE 204-15. As such, in particular embodiments, the core of DPE 204-14 may not access the memory module of DPE 204-15.

In particular embodiments, whether a core of a DPE is able to access the memory module of another DPE depends upon the number of memory interfaces included in the memory module and whether such cores are connected to an available one of the memory interfaces of the memory module. In the example above, the memory module of DPE 204-15 includes four memory interfaces, where the core of each of DPEs 204-16, 204-5, and 204-25 is connected to such a memory interface. Core 302 within DPE 204-15 itself is connected to the fourth memory interface. Each memory interface may include one or more read and/or write channels. In particular embodiments, each memory interface includes multiple read channels and multiple write channels so that the particular core attached thereto is capable of reading and/or writing to multiple banks within memory module 304 concurrently.

In other examples, more than four memory interfaces may be available. Such other memory interfaces may be used to allow DPEs on a diagonal to DPE 204-15 to access the memory module of DPE 204-15. For example, if the cores in DPEs such as DPEs 204-14, 204-24, 204-26, 204-4, and/or 204-6 are also coupled to an available memory interface of the memory module in DPE 204-15, such other DPEs would also be capable of accessing the memory module of DPE 204-15.

Memory module 304 may include configuration registers 336. Configuration registers 336 may be loaded with configuration data to control operation of memory module 304. In the example of FIG. 3, configuration registers 336 (and 324) are addressable (e.g., may be read and/or written) via the memory mapped network of DPE interconnect 306 described in greater detail below.

In the example of FIG. 3, DPE interconnect 306 is specific to DPE 204. DPE interconnect 306 facilitates various operations including communication between DPE 204 and one or more other DPEs of DPE array 202 and/or communication with other subsystems of the SoC 200. DPE interconnect 306 further enables configuration, control, and debugging of DPE 204.

In particular embodiments, DPE interconnect 306 is implemented as an on-chip interconnect. An example of an on-chip interconnect is an Advanced Microcontroller Bus Architecture (AMBA) eXtensible Interface (AXI) bus (e.g., or switch). An AMBA AXI bus is an embedded microcontroller bus interface for use in establishing on-chip connections between circuit blocks and/or systems. An AXI bus is provided herein as an example of interconnect circuitry that may be used with the inventive arrangements described within this disclosure and, as such, is not intended as a limitation. Other examples of interconnect circuitry may include other types of buses, crossbars, and/or other types of switches.

In one or more embodiments, DPE interconnect 306 includes two different networks. The first network is capable of exchanging data with other DPEs of DPE array 202 and/or other subsystems of the SoC 200. For example, the first network is capable of exchanging application data. The second network is capable of exchanging data such as configuration, control, and/or debugging data for the DPE (s).

In the example of FIG. 3, the first network of DPE interconnect 306 is formed of stream switch 326 and one or more stream interfaces (not shown). For example, stream switch 326 includes a stream interface for connecting to each of core 302, memory module 304, memory mapped switch 332, a DPE above, a DPE to the left, a DPE to the right, and a DPE below. Each stream interface may include one or more masters and one or more slaves.

Stream switch 326 is capable of allowing non-neighboring DPEs and/or DPEs that are not coupled to a memory interface of memory module 304 to communicate with core 302 and/or memory module 304 via the DPE interconnect network formed by the DPE interconnects of the respective DPEs 204 of DPE array 202.

Referring again to FIG. 2 and using DPE 204-15 as a point of reference, stream switch 326 is coupled to, and capable of, communicating with another stream switch located in the DPE interconnect of DPE 204-14. Stream switch 326 is coupled to, and capable of, communicating with another stream switch located in the DPE interconnect of DPE 204-25. Stream switch 326 is coupled to, and capable of, communicating with another stream switch located in the DPE interconnect of DPE 204-16. Stream switch 326 is coupled to, and capable of, communicating with another stream switch located in the DPE interconnect of DPE 204-5. As such, core 302 and/or memory module 304 are also capable of communicating with any of the DPEs within DPE array 202 via the DPE interconnects in the DPEs.

Stream switch 326 may also be used to interface to subsystems such as PL 214 and/or NoC 208. In general, stream switch 326 is programmed to operate as a circuit-switching stream interconnect or a packet-switched stream interconnect. A circuit-switching stream interconnect is capable of implementing point-to-point, dedicated streams that are suitable for high-bandwidth communication among DPEs. A packet-switching stream interconnect allows streams to be shared to time-multiplex multiple logical streams onto one physical stream for medium bandwidth communication.

Stream switch 326 may include configuration registers (abbreviated as "CR" in FIG. 3) 334. Configuration data may be written to configuration registers 334 by way of the memory mapped network of DPE interconnect 306. The configuration data loaded into configuration registers 334 dictates which other DPEs and/or subsystems (e.g., NoC 208, PL 214, and/or PS 212) DPE 204 will communicate with and whether such communications are established as circuit-switched point-to-point connections or as packet-switched connections.

The second network of DPE interconnect 306 is formed of memory mapped switch 332. Memory mapped switch 332 includes a plurality of memory mapped interfaces (not shown). Each memory mapped interface may include one or more masters and one or more slaves. For example, memory mapped switch 332 includes a memory mapped interface for connecting to each of core 302, memory module 304, the memory mapped switch in the DPE above DPE 204, and the memory mapped switch in the DPE below DPE 204.

Memory mapped switch 332 is used to convey configuration, control, and debugging data for DPE 204. In the example of FIG. 3, memory mapped switch 332 is capable of receiving configuration data that is used to configure DPE 204. Memory mapped switch 332 may receive configuration data from a DPE located below DPE 204 and/or from SoC interface block 206. Memory mapped switch 332 is capable of forwarding received configuration data to one or more other DPEs above DPE 204, to core 302 (e.g., to program memory 308 and/or to configuration registers 324), to memory module 304 (e.g., to memory within memory module 304 and/or to configuration registers 336), and/or to configuration registers 334 within stream switch 326.

DPE interconnect 306 is coupled to the DPE interconnect of each neighboring DPE and/or SoC interface block 206 depending upon the location of DPE 204. Taken collectively, DPE interconnects of DPEs 204 form a DPE interconnect network (which may include the stream network and/or the memory mapped network). The configuration registers of the stream switches of each DPE may be programmed by loading configuration data through the memory mapped switches. Through configuration, the stream switches and/or stream interfaces are programmed to establish connections, whether packet-switched or circuit-switched, with other endpoints, whether in one or more other DPEs 204 and/or in SoC interface block 206.

In one or more embodiments, DPE array 202 is mapped to the address space of a processor system such as PS 212. Accordingly, any configuration registers and/or memories within DPE 204 may be accessed via a memory mapped interface. For example, memory in memory module 304, program memory 308, configuration registers 324 in core 302, configuration registers 336 in memory module 304, and/or configuration registers 334 may be read and/or written via memory mapped switch 332.

In the example of FIG. 3, memory mapped switch 332 is capable of receiving configuration data for DPE 204. The configuration data may include program code that is loaded into program memory 308 (if included), configuration data for loading into configuration registers 324, 334, and/or 336, and/or data to be loaded into memory (e.g., memory banks) of memory module 304. In the example of FIG. 3, configuration registers 324, 334, and 336 are shown as being located within the particular circuit structures that the configuration registers are intended to control, e.g., core 302, stream switch 326, and memory module 304. The example of FIG. 3 is for purposes of illustration only and illustrates that elements within core 302, memory module 304, and/or stream switch 326 may be programmed by way of loading configuration data into the corresponding configuration registers. In other embodiments, the configuration registers may be consolidated within a particular region of DPE 204 despite controlling operation of components distributed throughout DPE 204.

Accordingly, stream switch 326 may be programmed by loading configuration data into configuration registers 334. The configuration data programs stream switch 326 to operate in a circuit-switching mode between two different DPEs and/or other subsystems or in a packet-switching mode between selected DPEs and/or other subsystems. Thus, connections established by stream switch 326 to other stream interfaces and/or switches are programmed by loading suitable configuration data into configuration registers 334 to establish actual connections or application data paths within DPE 204, with other DPEs, and/or with other subsystems of IC 300.

Figure 4:
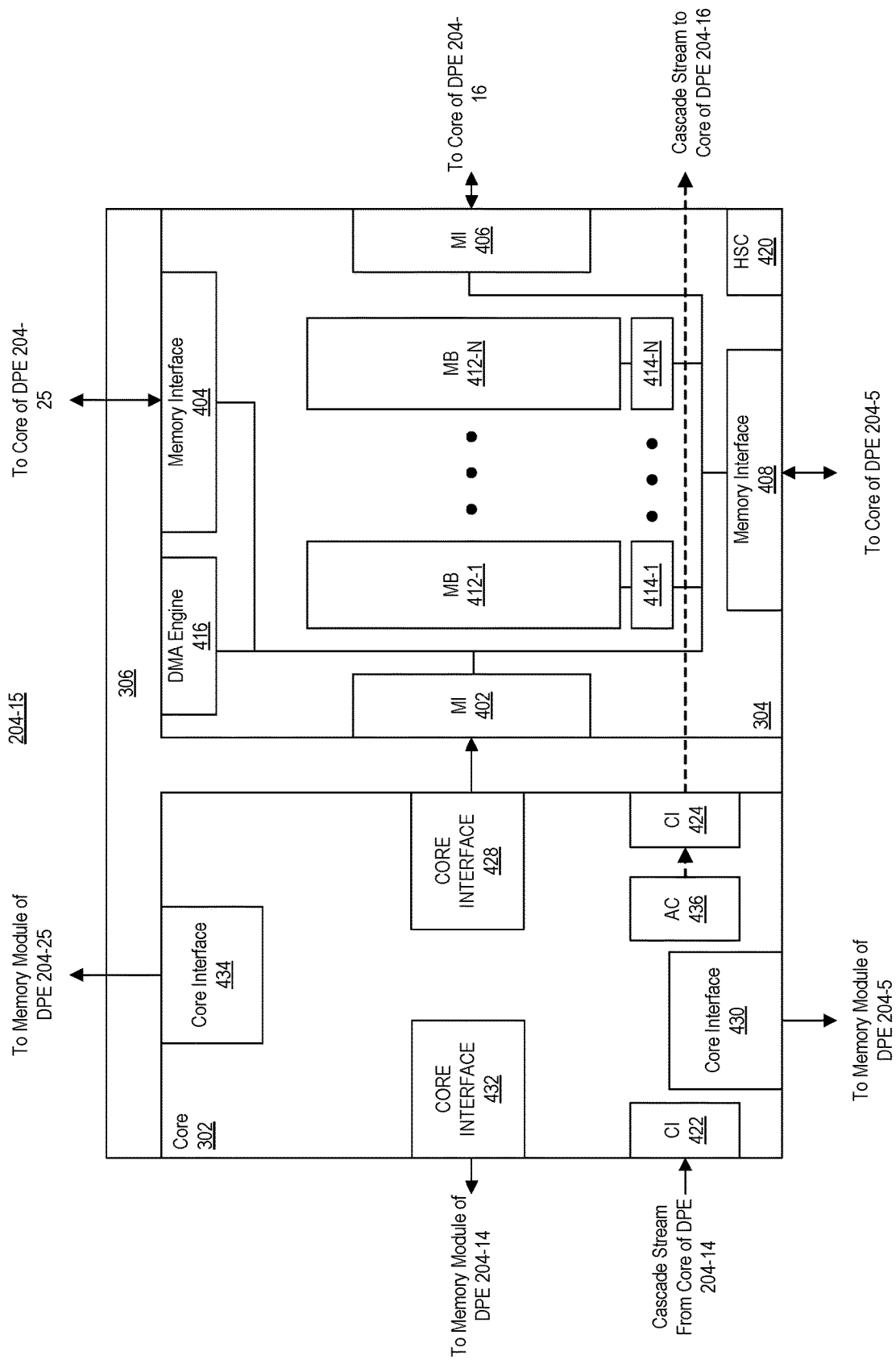
FIG. 4 illustrates further aspects of the example architecture of FIG. 3.

FIG. 4 illustrates further aspects of the example architecture of FIG. 3. In the example of FIG. 4, details relating to DPE interconnect 306 are not shown. FIG. 4 illustrates connectivity of core 302 with other DPEs through shared memory. FIG. 4 also illustrates additional aspects of memory module 304. For purposes of illustration, FIG. 4 refers to DPE 204-15.

As pictured, memory module 304 includes a plurality of memory interfaces 402, 404, 406, and 408. Within FIG. 4, memory interfaces 402 and 408 are abbreviated as "MI." Memory module 304 further includes a plurality of memory banks 412-1 to 412-N. In particular embodiments, memory module 304 includes eight memory banks. In other embodiments, memory module 304 may include fewer or more memory banks 412. In one or more embodiments, each memory bank 412 is single-ported thereby allowing up to one access to each memory bank each clock cycle. In the case where memory module 304 includes eight memory banks 412, such a configuration supports eight parallel accesses each clock cycle. In other embodiments, each memory bank 412 is dual-ported or multi-ported thereby allowing a larger number of parallel accesses each clock cycle.

In the example of FIG. 4, each of memory banks 412-1 through 412-N has a respective arbiter 414-1 through 414-N. Each arbiter 414 is capable of generating a stall signal in response to detecting conflicts. Each arbiter 414 may include arbitration logic. Further, each arbiter 414 may include a crossbar. Accordingly, any master is capable of writing to any particular one or more of memory banks 412. As noted in connection with FIG. 3, memory module 304 is connected to memory mapped switch 332 thereby facilitating reading and writing of data to memory bank 412. As such, the particular data stored in memory module 304 may be controlled, e.g., written, as part of a configuration, control, and/or debugging process through memory mapped switch 332.

Memory module 304 further includes a direct memory access (DMA) engine 416. In one or more embodiments, DMA engine 416 includes at least two interfaces. For example, one or more interfaces are capable of receiving input data streams from DPE interconnect 306 and writing the received data to memory banks 412. One or more other interfaces are capable of reading data from memory banks 412 and sending the data out via a stream interface (e.g., a stream switch) of DPE interconnect 306. For example, DMA engine 416 may include stream interface for accessing stream switch 326 of FIG. 3.

Memory module 304 is capable of operating as a shared memory that may be accessed by a plurality of different DPEs. In the example of FIG. 4, memory interface 402 is coupled to core 302 via core interface 428 included in core 302. Memory interface 402 provides core 302 with access to memory banks 412 through arbiters 414. Memory interface 404 is coupled to the core of DPE 204-25 (e.g., via a core interface in DPE 204-25). Memory interface 404 provides the core of DPE 204-25 with access to memory banks 412. Memory interface 406 is coupled to the core of DPE 204-16 (e.g., via a core interface of DPE 204-16). Memory interface 406 provides the core of DPE 204-16 with access to memory banks 412. Memory interface 408 is coupled to the core of DPE 204-5 (e.g., via a core interface of DPE 204-5). Memory interface 408 provides the core of DPE 204-5 with access to memory banks 412. Accordingly, in the example of FIG. 4, each DPE, e.g., each core, that has a shared boundary with memory module 304 of DPE 204-15 is capable of reading and writing to memory banks 412. In the example of FIG. 4, the core of DPE 204-14 does not have direct access to memory module 304 of DPE 204-15. For purposes of illustration, the cores of DPEs 204-25, 204-5, and 204-16 are considered neighboring cores to memory module 304 of DPE 204-15. Core 302 of DPE 204-15 is also considered a neighboring core of memory module 304 of DPE 204-15.

Core 302 is capable of accessing memory modules of other neighboring DPEs via core interfaces 430, 432, and 434. In the example of FIG. 4, core interface 434 is coupled to a memory interface of DPE 204-25. Accordingly, core 302 is capable of accessing the memory module of DPE 204-25 via core interface 434 and the memory interface contained within the memory module of DPE 204-25. Core interface 432 is coupled to a memory interface of DPE 204-14. Accordingly, core 302 is capable of accessing the memory module of DPE 204-14 via core interface 432 and the memory interface contained within the memory module of DPE 204-14. Core interface 430 is coupled to a memory interface within DPE 204-5. Accordingly, core 302 is capable of accessing the memory module of DPE 204-5 via core interface 430 and the memory interface contained within the memory module of DPE 204-5. As discussed, core 302 is capable of accessing memory module 304 within DPE 204-15 via core interface 428 and memory interface 402.

In the example of FIG. 4, core 302 is capable of reading and writing to any of the memory modules of DPEs that share a boundary with core 302 in DPE 204-15 (e.g., memory modules of DPEs 204-25, 204-14, and 204-5 called neighboring memory modules). In one or more embodiments, core 302 is capable of viewing the memory modules within DPEs 204-25, 204-15, 204-14, and 204-5 as a single, contiguous memory (e.g., as a single address space). As such, the process of core 302 reading and/or writing to memory modules of such DPEs is the same as core 302 reading and/or writing to memory module 304. Core 302 is capable of generating addresses for reads and writes presuming this contiguous memory model. Core 302 is capable of directing the read and/or write requests to the appropriate core interface 428, 430, 432, and/or 434 based upon the addresses that are generated.

As noted, core 302 is capable of mapping read and/or write operations in the correct direction through core interface 428, 430, 432, and/or 434 based upon the addresses of such operations. When core 302 generates an address for a memory access, core 302 is capable of decoding the address to determine the direction (e.g., the particular DPE to be accessed) and forwards the memory operation to the correct core interface in the determined direction.

Accordingly, core 302 is capable of communicating with the core of DPE 204-25 via a shared memory which may be the memory module within DPE 204-25 and/or memory module 304 of DPE 204-15. Core 302 is capable of communicating with the core of DPE 204-14 via a shared memory which is the memory module within DPE 204-14. Core 302 is capable of communicating with the core of DPE 204-5 via a shared memory which may be the memory module within DPE 204-5 and/or memory module 304 of DPE 204-15. Further, core 302 is capable of communicating with the core of DPE 204-16 via a shared memory which is memory module 304 within DPE 204-15.

As discussed, DMA engine 416 may include one or more stream-to-memory interfaces. Through DMA engine 416, application data may be received from other sources within the SoC 200 and stored in memory module 304. For example, data may be received from other DPEs that do and/or do not share a boundary with DPE 204-15 by way of stream switch 326. Data may also be received from other subsystems of the SoC (e.g., NoC 208, hardwired circuit blocks 210, PL 214, and/or PS 212) by way of SoC interface block 206 through the stream switches of the DPEs. DMA engine 416 is capable of receiving such data from the stream switches and writing the data to an appropriate memory bank or memory banks 412 within memory module 304.

DMA engine 416 may include one or more memory-to-stream interfaces. Through DMA engine 416, data may be read from memory bank(s) 412 of memory module 304 and sent to other destinations via the stream interfaces. For example, DMA engine 416 is capable of reading data from memory module 304 and sending such data to other DPEs that do and/or do not share a boundary with DPE 204-15 by way of the stream switches. DMA engine 416 is also capable of sending such data to other subsystems (e.g., NoC 208, hardwired circuit blocks 210, PL 214, and/or PS 212) by way of the stream switches and SoC interface block 206.

In one or more embodiments, DMA engine 416 is programmed by memory mapped switch 332 within DPE 204-15. For example, DMA engine 416 may be controlled by configuration registers 336. Configuration registers 336 may be written using memory mapped switch 332 of DPE interconnect 306. In particular embodiments, DMA engine 416 may be controlled by the stream switch 326 within DPE 204-15. For example, DMA engine 416 may include control registers that may be written by stream switch 326 connected thereto. Streams received via stream switch 326 within DPE interconnect 306 may be connected to DMA engine 416 in memory module 304 and/or directly to core 302 depending upon the configuration data loaded into configuration registers 324, 334, and/or 336. Streams may be sent from DMA engine 416 (e.g., memory module 304) and/or core 302 depending upon the configuration data loaded into configuration registers 324, 334, and/or 336.

Memory module 304 further may include hardware synchronization circuitry 420 (abbreviated as "HSC" in FIG. 4). In general, hardware synchronization circuitry 420 is capable of synchronizing operation of different cores (e.g., cores of neighboring DPEs), core 302 of FIG. 4, DMA engine 416, and other external masters (e.g., PS 212) that may communicate via DPE interconnect 306. As an illustrative and non-limiting example, hardware synchronization circuitry 420 is capable of synchronizing two different cores, stream switches, memory mapped interfaces, and/or DMA engines in DPE 204-15 and/or different DPEs accessing the same, e.g., a shared, buffer in memory module 304.

In the case where two DPEs are not neighbors, the two DPEs do not have access to a common memory module. In that case, application data may be transferred via a data stream (the terms "data stream" and "stream" may be used interchangeably from time-to-time within this disclosure). As such, the local DMA engine is capable of converting the transfer from a local memory-based transfer to a stream-based transfer. In that case, core 302 and DMA engine 416 are capable of synchronizing using hardware synchronization circuitry 420.

PS 212 is capable of communicating with core 302 via memory mapped switch 332. PS 212, for example, is capable of accessing memory module 304 and hardware synchronization circuitry 420 by initiating memory reads and writes. In another embodiment, hardware synchronization circuitry 420 may also send an interrupt to PS 212 when status of a lock changes to avoid polling by PS 212 of hardware synchronization circuitry 420. PS 212 is also capable of communicating with DPE 204-15 via the stream interfaces.

In addition to communicating with neighboring DPEs through shared memory modules and neighboring and/or non-neighboring DPEs via DPE interconnect 306, core 302 may include cascade interfaces. In the example of FIG. 4, core 302 includes cascade interfaces 422 and 424 (abbreviated as "CI" in FIG. 4). Cascade interfaces 422 and 424 are capable of providing direct communication with other cores. As pictured, cascade interface 422 of core 302 receives an input data stream directly from the core of DPE 204-14. The data stream received via cascade interface 422 may be provided to the data processing circuitry within core 302. Cascade interface 424 of core 302 is capable of sending an output data stream directly to the core of DPE 204-16.

In the example of FIG. 4, each of cascade interface 422 and cascade interface 424 may include a first-in-first-out (FIFO) interface for buffering. In particular embodiments, cascade interfaces 422 and 424 are capable of conveying data streams that may be hundreds of bits in width. The particular bit width of cascade interfaces 422 and 424 is not intended as a limitation. In the example of FIG. 4, cascade interface 424 is coupled to an accumulator register 436 (abbreviated as "AC" within FIG. 4) within core 302. Cascade interface 424 is capable of outputting the contents of accumulator register 436 and may do so each clock cycle. Accumulation register 436 may store data that is generated and/or being operated upon by data processing circuitry within core 302.

In the example of FIG. 4, cascade interfaces 422 and 424 may be programmed based upon configuration data loaded into configuration registers 324. For example, based upon configuration registers 324, cascade interface 422 may be activated or deactivated. Similarly, based upon configuration registers 324, cascade interface 424 may be activated or deactivated. Cascade interface 422 may be activated and/or deactivated independently of cascade interface 424.

In one or more other embodiments, cascade interfaces 422 and 424 are controlled by core 302. For example, core 302 may include instructions to read/write to cascade interfaces 422 and/or 424. In another example, core 302 may include hardwired circuitry that is capable of reading and/or writing to cascade interfaces 422 and/or 424. In particular embodiments, cascade interfaces 422 and 424 may be controlled by an entity outside of core 302.

Within the embodiments described within this disclosure, DPEs 204 do not include cache memories. By omitting cache memories, DPE array 202 is capable of achieving predictable, e.g., deterministic, performance. Further, significant processing overhead is avoided since maintaining coherency among cache memories located in different DPEs is not required.

In accordance with one or more embodiments, cores 302 of DPEs 204 do not have input interrupts. Thus, cores 302 of DPEs 204 are capable of operating uninterrupted. Omitting input interrupts to cores 302 of DPEs 204 also allows DPE array a02 to achieve predictable, e.g., deterministic, performance.

Figure 5:
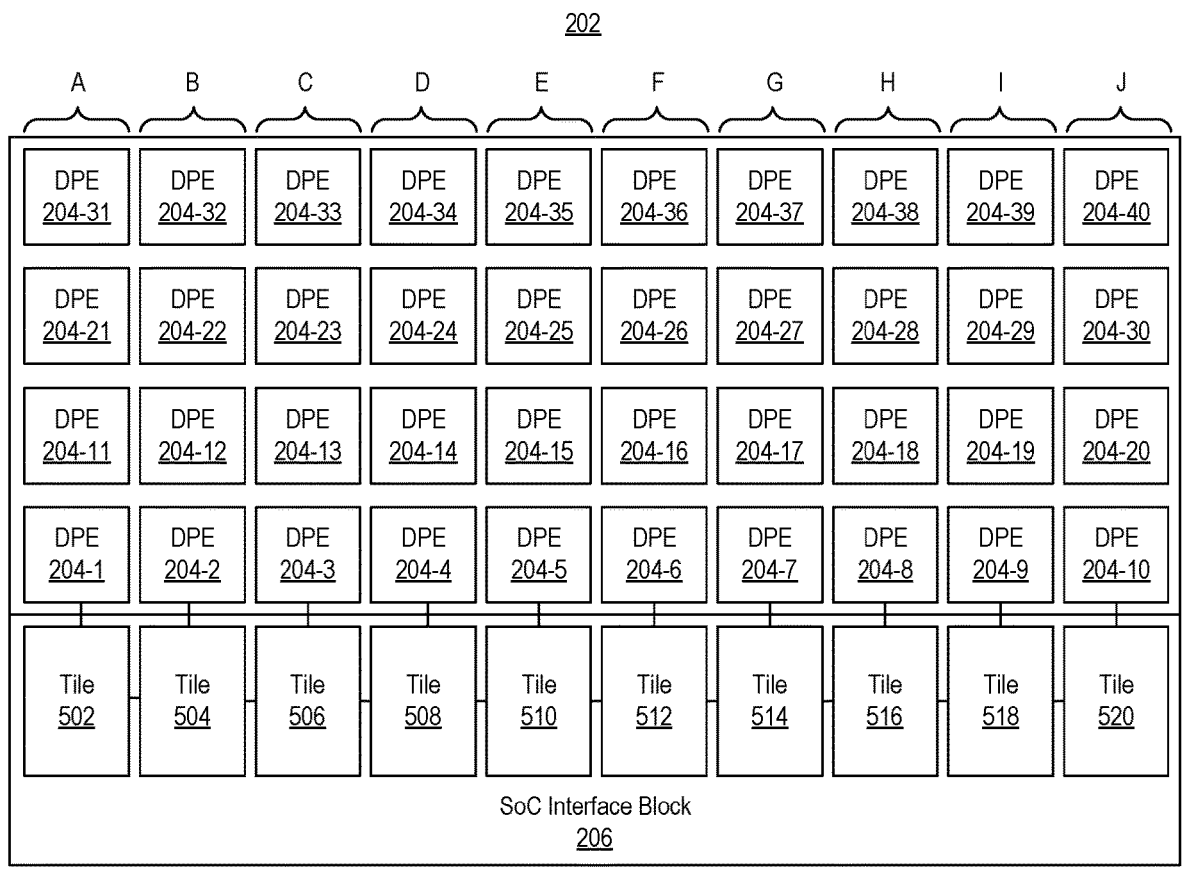
FIG. 5 illustrates another example architecture for a DPE array.

FIG. 5 illustrates another example architecture for a DPE array. In the example of FIG. 5, SoC interface block 206 provides an interface between DPEs 204 and other subsystems of the SoC 200. SoC interface block 206 integrates DPEs into the device. SoC interface block 206 is capable of conveying configuration data to DPEs 204, conveying events from DPEs 204 to other subsystems, conveying events from other subsystems to DPEs 204, generating and conveying interrupts to entities external to DPE array 202, conveying application data between other subsystems and DPEs 204, and/or conveying trace and/or debug data between other subsystems and DPEs 204.

In the example of FIG. 5, SoC interface block 206 includes a plurality of interconnected tiles. For example, SoC interface block 206 includes tiles 502, 504, 506, 508, 510, 512, 514, 516, 518, and 520. In the example of FIG. 5, tiles 502-520 are organized in a row. In other embodiments, tiles may be arranged in a column, in a grid, or in another layout. For example, SoC interface block 206 may be implemented as a column of tiles on the left of DPEs 204, on the right of DPEs 204, between columns of DPEs 204, or the like. In another embodiment, SoC interface block 206 may be located above DPE array 202. SoC interface block 206 may be implemented so that tiles are located in any combination of below DPE array 202, to the left of DPE array 202, to the right of DPE array 202, and/or above DPE array 202. In this regard, FIG. 5 is provided for purposes of illustration and not limitation.

In one or more embodiments, tiles 502-520 have a same architecture. In one or more other embodiments, tiles 502-520 may be implemented with two or more different architectures. In particular embodiments, different architectures may be used to implement tiles within SoC interface block 206 where each different tile architecture supports communication with a different type of subsystem or combination of subsystems of SoC 200.

In the example of FIG. 5, tiles 502-520 are coupled so that data may be propagated from one tile to another. For example, data may be propagated from tile 502 through tiles 504, 506, and on down the line of tiles to tile 520. Similarly, data may be propagated in the reverse direction from tile 520 to tile 502. In one or more embodiments, each of tiles 502-520 is capable of operating as an interface for a plurality of DPEs. For example, each of tiles 502-520 is capable of operating as an interface for a subset of the DPEs 204 of DPE array 202. The subset of DPEs to which each tile provides an interface may be mutually exclusive such that no DPE is provided with an interface by more than one tile of SoC interface block 206.

In one example, each of tiles 502-520 provides an interface for a column of DPEs 204. For purposes of illustration, tile 502 provides an interface to the DPEs of column A. Tile 504 provides an interface to the DPEs of column B, etc. In each case, the tile includes a direct connection to an adjacent DPE in the column of DPEs, which is the bottom DPE in this example. Referring to column A, for example, tile 502 is directly connected to DPE 204-1. Other DPEs within column A may communicate with tile 502 but do so through the DPE interconnects of the intervening DPEs in the same column.

For example, tile 502 is capable of receiving data from another source such as PS 212, PL 214, and/or another hardwired circuit block 210 such as an application-specific circuit block. Tile 502 is capable of providing those portions of the data addressed to DPEs in column A to such DPEs while sending data addressed to DPEs in other columns (e.g., DPEs for which tile 502 is not an interface) on to tile 504. Tile 504 may perform the same or similar processing where data received from tile 502 that is addressed to DPEs in column B is provided to such DPEs, while sending data addressed to DPEs in other columns on to tile 506, and so on.

In this manner, data may propagate from tile to tile of SoC interface block 206 until reaching the tile that operates as an interface for the DPEs to which the data is addressed (e.g., the "target DPE(s)"). The tile that operates as an interface for the target DPE(s) is capable of directing the data to the target DPE(s) using the memory mapped switches of the DPEs and/or the stream switches of the DPEs.

As noted, the use of columns is an example implementation. In other embodiments, each tile of SoC interface block 206 is capable of providing an interface to a row of DPEs of DPE array 202. Such a configuration may be used in cases where SoC interface block 206 is implemented as a column of tiles, whether on the left, right, or between columns of DPEs 204. In other embodiments, the subset of DPEs to which each tile provides an interface may be any combination of fewer than all DPEs of DPE array 202. For example, DPEs 204 may be apportioned to tiles of SoC interface block 206. The particular physical layout of such DPEs may vary based upon connectivity of the DPEs as established by DPE interconnects. For example, tile 502 may provide an interface to DPEs 204-1, 204-2, 204-11, and 204-12. Another tile of SoC interface block 206 may provide an interface to four other DPEs, and so forth.

Figure 6:
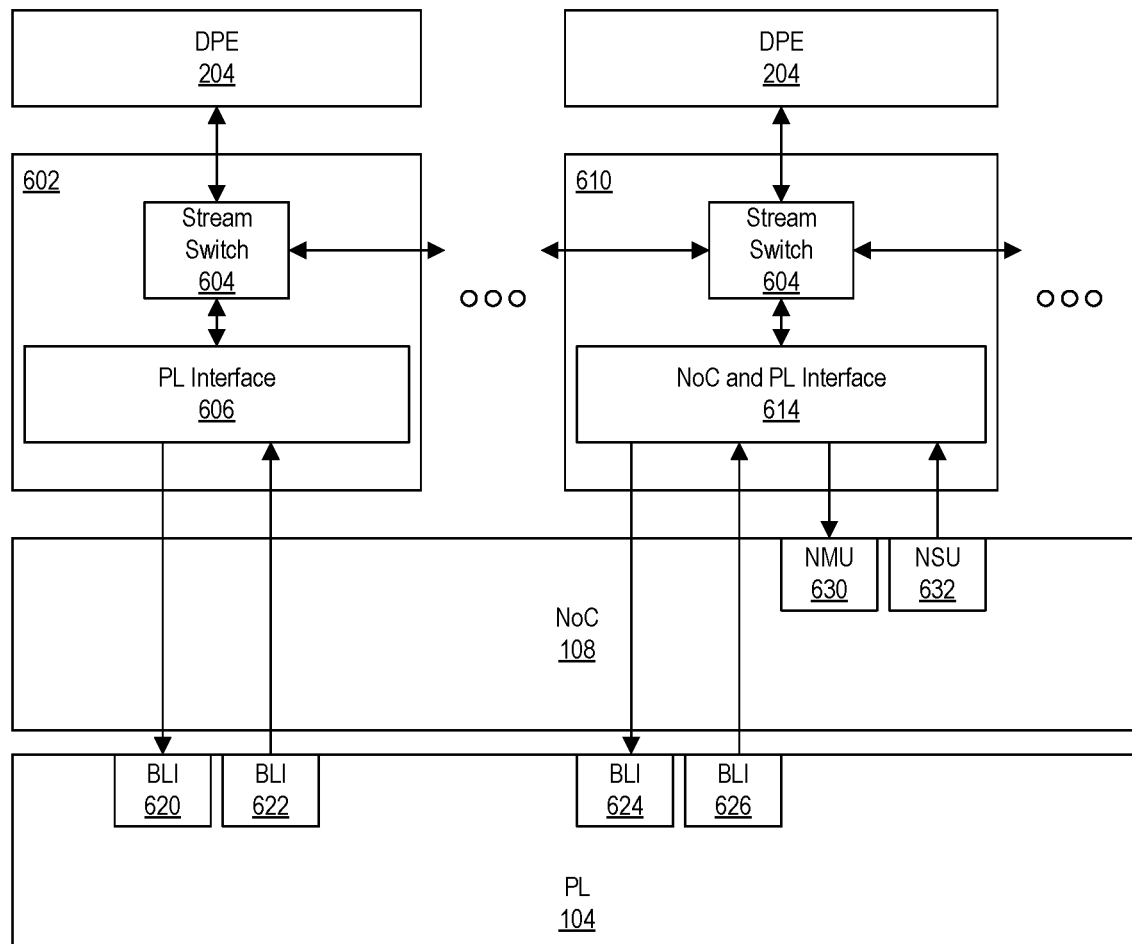
FIG. 6 illustrates an example architecture for tiles of the SoC interface block of the DPE array.

FIG. 6 illustrates an example architecture for tiles of SoC interface block 206. In the example of FIG. 6, two different types of tiles for SoC interface block 206 are shown. Tile 602 is configured to serve as an interface between DPEs and only PL 214. Tile 610 is configured to serve as an interface between DPEs and NoC 208 and between DPEs and PL 214. SoC interface block 206 may include a combination of tiles using both architectures as illustrated for tile 602 and for tile 610 or, in another example, only tiles having an architecture as illustrated for tile 610.

In the example of FIG. 6, tile 602 includes a stream switch 604 connected to a PL interface 606 and to a DPE such as DPE 204-1 immediately above. PL interface 606 connects to Boundary Logic Interface (BLI) circuit 620 and BLI circuit 622 each located in PL 214. Tile 610 includes a stream switch 612 connected to NoC and PL interface 614 and to a DPE such as DPE 204-5 immediately above. NoC and PL interface 614 connects to BLI circuits 624 and 626 in the PL 214 and also to NoC Master Unit (NMU) 630 and NoC Slave Unit (NSU) 632 of the NoC 208.

In the example of FIG. 6, each stream interface 604 is capable of outputting six different 32-bit data streams to, and receiving 4 different 32-bit data streams from, the DPE coupled thereto. Each of PL interface 606 and NoC and PL interface 614 is capable of providing 6 different 64-bit data streams to PL 214 by way of BLI 620 and BLI 624, respectively. In general, each of BLIs 620, 622, 624, and 626 provides an interface or connection point within PL 214 to which PL interface 606 and/or NoC and PL interface 614 connect. Each of PL interface 606 and NoC and PL interface 614 is capable of receiving 8 different 64-bit data streams from PL 214 by way of BLI 622 and BLI 624, respectively.

NoC and PL interface 614 is also connected to NoC 208. In the example of FIG. 6, NoC and PL interface 614 connects to one or more NMUs 630 and to one or more NSUs 632. In one example, NoC and PL interface 614 is capable of providing two different 128-bit data streams to NoC 208, wherein each data stream is provided to a different NMU 630. NoC and PL interface 614 is capable of receiving two different 128-bit data streams from NoC 208, where each data stream is received from a different NSU 632.

Stream switches 604 in adjacent tiles are connected. In an example, stream switches 604 in adjacent tiles are capable of communicating by way of four different 32-bit data streams in each of the left and right directions (e.g., so long as a tile is to the right or to the left as the case may be).

Tiles 602 and 610 each may include one or more memory mapped switches to convey configuration data. For purposes of illustration, the memory mapped switches are not shown. The memory mapped switches, for example, are capable of connecting vertically to a memory mapped switch of the DPE immediately above, to memory mapped switches in other adjacent tiles in SoC interface block 206 in the same or similar manner as stream switches 604, to configuration registers in tiles 602 and 610 (not shown), and/or to PL interface 608 or NoC and PL interface 614 as the case may be.

The various bit widths and numbers of data streams described in connection with the various switches included in the DPEs 204 and/or the tiles 602 and/or 610 of the SoC interface block 206 are provided for purposes of illustration and are not intended to be limiting of the inventive arrangements described within this disclosure. In other embodiments, a selected tile of SoC interface block 206 may include a clock (not shown) configured to generate a clock signal that is distributed to the DPEs 204.

Figure 7A:
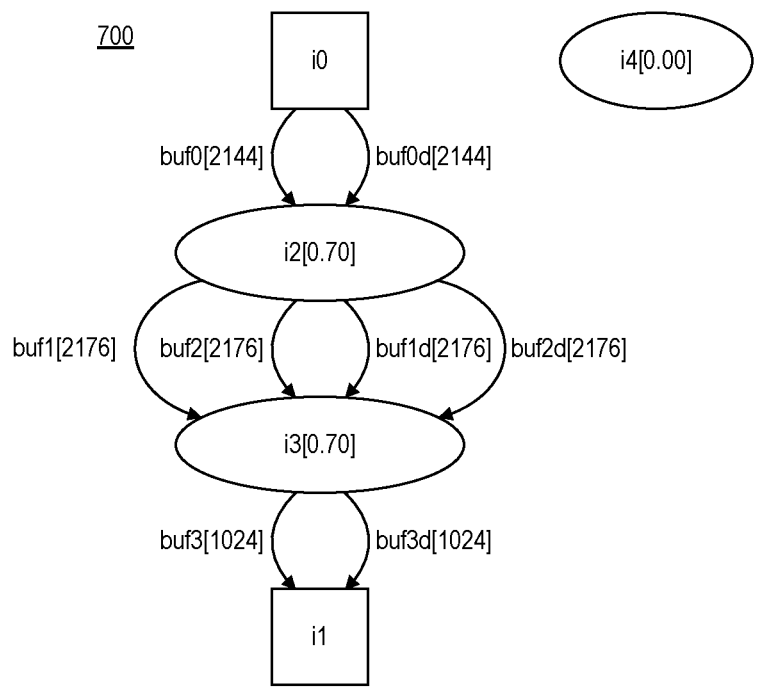
FIGS. 7A and 7B illustrate an example of an application expressed as a DFG in different stages of the mapping process.
Figure 7B:
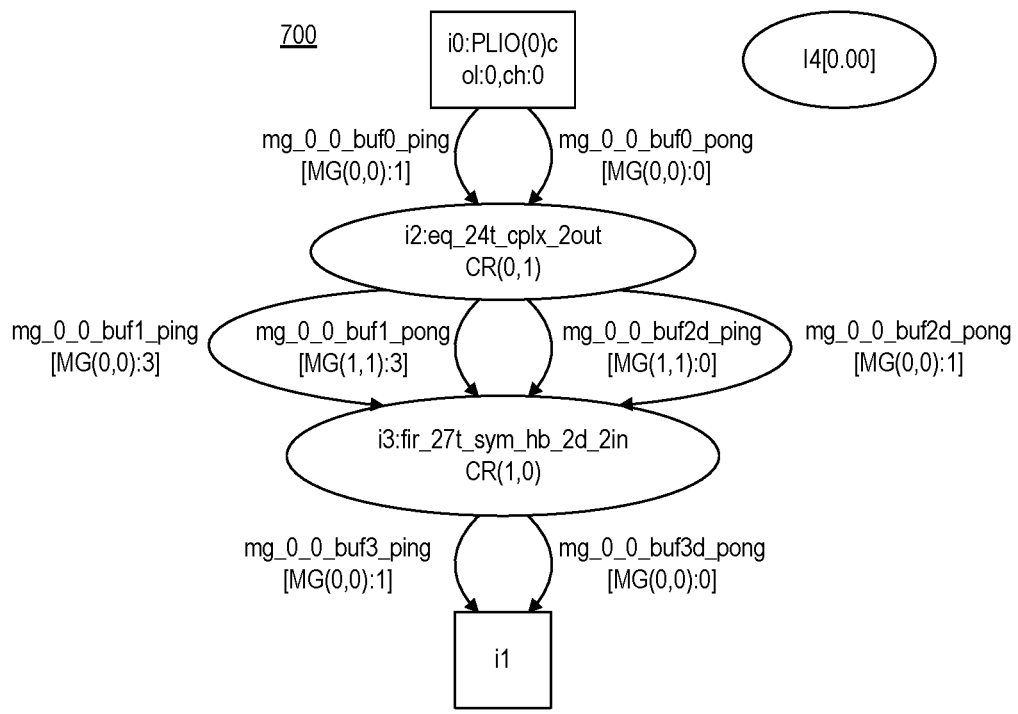

FIGS. 7A and 7B (collectively referred to as FIG. 7) illustrate an example of an application 700 expressed as a DFG in different stages of the mapping process. Referring to FIG. 7A, application 700 is expressed as a DFG. Application 700 includes a plurality of nodes shown as i0, i1, i2, i3, and i4. Nodes i0 and i1 represent kernels that are to be implemented in the PL. Nodes i0 and i1 may be referred to as PL nodes. Nodes i2 and i3 represent kernels to be implemented in DPE array 202. Nodes i2 and i3 may be referred to as DPE compute nodes or DPE nodes. Node i4 represents a controller node that is mapped to PS 212.

The arcs connecting the nodes represent buffers used to exchange data and facilitate inter-node communication. The size of each buffer is annotated in application 700. For example, node i2 receives input data blocks (e.g., "buf0") from node i0 in the PL. Each of the input data blocks received by node i2 is sized at 2144 bytes. Node i2 generates output data blocks (e.g., "buf1" and "buf2") each sized at 2176 bytes. The output data blocks from node i2 are provided to node i3 as inputs. Node i3 generates two output data blocks (e.g., "buf3") each sized at 1024 bytes, which are provided to node i1 in the PL as input data.

FIG. 7B illustrates an example of application 700 after mapping onto DPE array 202 by system 102 of FIG. 1. For purposes of illustration, the DPE array may be indexed using an (x, y) coordinate system. In the example of FIG. 7B, nodes i2 and i3 (e.g., kernels i2 and i3) are mapped to DPEs (0,1) and (1,0) respectively. The input buffers to i2 are mapped to memory banks 0 and 1 of DPE (0,0) annotated as

[MG(0,0):0] and [MG(0,0):1] respectively on the edges connecting i0 and i2. The buffers connecting nodes i2 and i3 are mapped to memory bank 3 of DPE (0,0), memory bank 3 of DPE (1,1), memory bank 0 of DPE (1,1), and memory bank 1 of DPE (0,0). The buffers connecting node i3 and node i1 are mapped to memory banks 0 and 1 of DPE (0,0).

The system is also capable of assigning data flows exchanged between PL nodes and DPE nodes to channels in the SoC interface block. In the example of FIG. 7B, the data output from node i0 to node i2 is mapped to channel 0 of tile 0 of the SoC interface block. The data output from node i3 to node i1 is mapped to channel 1 of tile 0 of the SoC interface block. For purposes of illustration, each tile corresponds to one column of the SoC interface block. For example, "col:0" represents tile 0 with the tiles being indexed from 0 to N.

Figure 8:
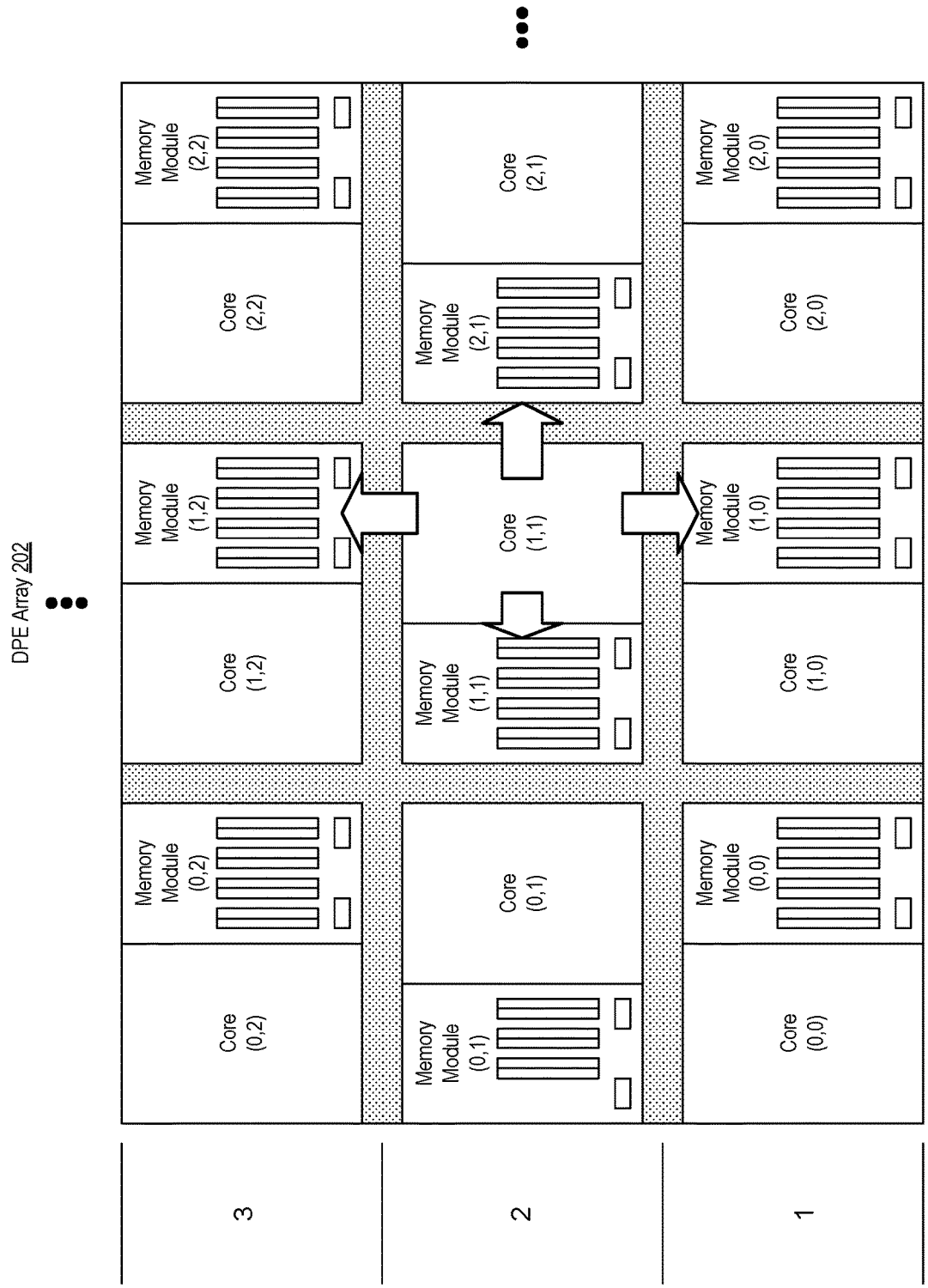
FIG. 8 illustrates example memory accesses within a DPE array.

FIG. 8 illustrates an example of memory accesses within DPE array 202. For purposes of illustration, only a portion of DPE array 202 is shown. FIG. 8 illustrates an example implementation of DPE array 202 where DPEs are horizontally inverted in alternating rows. For example, in rows 1 and 3, cores are to the left of the memory modules. In row 2, cores are to the right of the memory module. In the example of FIG. 8, the DPEs are labeled using the (x, y) coordinate system described in connection with FIG. 7. For example, the DPE in the lower left corner is DPE (0,0) and includes core (0,0) and memory module (0,0). The DPE in the upper right corner is DPE (2,2) and includes core (2,2) and memory module (2,2). FIG. 8 illustrates that a given core, e.g., core (1,1), is capable of accessing the memory modules in each of the up, down, left, and right directions using the core interfaces of core (1,1) that connect to the memory interfaces of DPEs (1,1), (2,1), (1,2), and (1,0).

Referring to FIGS. 7B and 8, the kernels i2 and i3 are mapped to core (0,1) and core (1,0) respectively. Buffers are mapped to memory banks in memory modules (0,0) and (1,1). As such, both core (0,1) and core (1,0) are able to access memory module (1,1) and memory module (0,0). Because the input buffers for kernel i2 and the output buffers for kernel i3 are mapped to memory module (0,0), the DPE compiler maps the data transfers to column 0, channel 1 (e.g., channel 1 of tile 502) of SoC interface block 206, which is located immediately below DPE (0,0) (e.g., DPE 204-1).

FIG. 8 illustrates that each DPE in DPE array 202 is capable of accessing memory modules on each cardinal side (north, south, east, and west). When mapping a kernel to a core of a DPE, the DPE compiler ensures that all of the buffers that are accessed by the kernel are mapped to one of the memory modules that can be directly accessed from that particular core (e.g., a neighboring memory module). Accordingly, when a buffer accessed by two different kernels is mapped to the same DPE as the kernels (e.g., both kernels implemented using a same core) or to a memory module that is immediately adjacent (in the north, south, east, or west direction) of each core implementing one of the kernels, no DMA engine is required for transferring data between the kernels.

FIG. 9 illustrates an example of memory accesses within DPE array 202 that do not require DMA engines. For purposes of illustration, only a portion of DPE array 202 is shown. In the example of FIG. 9, kernel 902 is mapped to core (0,0), while kernel 904 is mapped to core (0,1). Kernel 902, once implemented in core (0,0) is capable of generating a data output that is received as input by kernel 904 in core (0,1). Kernel 902 and kernel 904 communicate using buffers implemented in memory banks 0, 1, 2, and 3 (e.g., indexed from left to right) of memory module (0,1). Because each of kernels 902 and 904 is mapped to cores adjacent to the memory module to which the buffers linking kernels 902 and 904 are mapped, no DMA engines are needed.

Within memory module (0,1), a ping-pong buffer configuration is implemented. In the example, ping buffer 906 is implemented using memory banks 0 and 1 and is shown with cross-hatching. Pong buffer 908 is implemented in memory banks 2 and 3 and is shown with horizontal line shading. Kernel 902 is capable of writing to ping buffer 906 and pong buffer 908 using the core interface 910 of core (0,0) and the memory interface 912 of memory module (0,1). Kernel 902 is capable of writing data to ping buffer 906 and to pong buffer 908 in alternating fashion. Kernel 904 is capable of reading from ping buffer 906 and from pong buffer 908 through core interface 914 of core (0,1) and memory interface 916 of memory module (0,1).

While kernel 902 writes to ping buffer 906, kernel 904 is unable to read from ping buffer 906, but is able to read from pong buffer 908. While kernel 902 writes to ping buffer 908, kernel 904 is unable to read from pong buffer 908, but is able to read from ping buffer 906. In writing to ping buffer 906 and pong buffer 908, kernel 902 is capable of repeating a portion of the data written to the prior buffer. For example, when writing to pong buffer 908, kernel 902 repeats a portion or segment of data written to ping buffer 906, e.g., the last or end portion of data. For ease of illustration, arbiters 414 and HSC 420 of memory module (0,1) are not shown. Because reading and writing performed by kernels is performed between cores and memory modules that are adjacent in the north, south, east, and/or west directions, DMA engines are not required.

In one aspect, the system is capable of modeling DPE array 202 using a cost model. In the cost model, the neighboring memory modules of each core have zero cost to access. Referring to FIG. 8, for example, core (1,1) is capable of accessing memory module (1,2) to the north, memory module (2,1) to the east, memory module (1,0) to the south, and memory module (1,1) to the west (which is in the same DPE as core (1,1) in this case) at no cost. The cost model imposes a higher cost (e.g., a non-zero cost) for accessing memory modules from a core that do not neighbor the core. For example, were core (1,1) to access the memory module immediately above DPE (1,2), memory module (2,2), the memory module immediately to the right of DPE (2,1), memory module (2,0), memory module (0,0), or memory module (0,1), a higher cost would be imposed as such data transfers (e.g., accesses) require DMA engines. The system may be configured to map kernels to cores and buffers to memory modules with minimal cost, thereby favoring memory transfers as illustrated in FIG. 9.

FIG. 10 illustrates an example of memory accesses within DPE array 202 that require DMA engines. For purposes of illustration, only a portion of DPE array 202 is shown. In the example of FIG. 10, kernel 902 is mapped to core (0,0), while kernel 904 is mapped to core (0,4). Cores (0,0) and (0,4) are not adjacent to a same memory module. In other words, kernels 902 and 904 are mapped to cores that do not have access to a common memory module using only core interfaces and memory interfaces (e.g., no DMA engines). In the example of FIG. 10, DPE (0,0) and DPE (0,4) are not adjacent.

In order to share data between kernel 902 and kernel 904, an additional set of ping-pong buffers 1002 and 1004 are required that duplicate ping buffer 906 and pong buffer 908. Buffers 906 and 908 are accessible by kernel 902, while buffers 1002 and 1004 are accessible by kernel 904. Ping buffer 1002, implemented in memory banks 4 and 5 of memory module (0,4) and pong buffer 1004, implemented in memory banks 6 and 7 of memory module (0,4) are adjacent to core (0,4).

In the example of FIG. 10, kernel 902 is capable of writing to ping buffer 906 and pong buffer 908 using the core interface 910 of core (0,0) and the memory interface 912 of memory module (0,1). Kernel 902 is capable of writing data to ping buffer 906 and to pong buffer 908 in alternating fashion. DMA engine 1010 is capable of transferring data from ping buffer 906 or pong buffer 908, as the case may be, over the DPE interconnect (e.g., stream switches) to DMA engine 1012. DMA engine 1012 is capable of writing data received from ping buffer 906 to ping buffer 1002 and writing data from pong buffer 908 to pong buffer 1004. Kernel 904 is capable of reading from ping buffer 1002 and from pong buffer 1004 through core interface 1006 of core (0,4) and memory interface 1008 of memory module (0,4).

FIG. 10 illustrates an example where the system is unable to place kernels 902 and 904 into cores that each neighbor a same memory module. In the example of FIG. 10, the system may insert the additional buffers needed to implement data transfers as shown in FIG. 10. For example, the system adds buffers corresponding to ping buffer 1002 and pong buffer 1004 to the DFG of the application being mapped. The system is capable of mapping the newly added buffers to memory modules of DPE array 202. Because DMA engines are needed to effectuate data transfers between kernel 902 and kernel 904, a non-zero cost may be used to model the memory accesses illustrated in FIG. 10. The non-zero cost also reflects the fact that the memory transfer of FIG. 10 requires twice the amount of memory used for the memory transfer of FIG. 9.

FIGS. 8-10 illustrate how different costs may be imposed on data transfers depending upon the mapping of kernels to cores and buffers to memory modules. In another aspect, the system is capable of using another measure of cost relating to the presence of memory conflicts when mapping the DFG onto DPE array 202. In the example DPE array described within this disclosure, the memory modules include 8 memory banks. As noted, the memory module may include more or fewer memory banks. In any case, when multiple, e.g., two or more, memory accesses to the same memory bank in the same memory module occur in the same clock cycle, a memory access conflict arises. The system is capable of mapping the DFG to DPE array 202 to minimize not only usage of DMA engines, but also the presence of memory access conflicts.

In general, referring to DPE array 202, memory access conflicts may be classified into four different types. A first type of memory access conflict is an intra-core memory access conflict. In particular implementations, the cores of the DPEs utilize Very Large Instruction Word (VLIW) instructions. These instructions, for example, may be 128 bits wide. As such, a single VLIW instruction can include multiple memory access instructions. In one example implementation, each VLIW may include up to two load instructions and one store instruction. An intra-core memory access conflict occurs when two or more memory operations in the same, single instruction access the same memory bank or memory banks. The memory operations, being in the same instruction, occur in the same clock cycle. An intra-core memory access conflict causes a memory stall and, in turn, a core stall.

A second type of memory access conflict is an inter-core memory access conflict. An inter-core memory access conflict occurs when two or more different cores access the same memory bank in the same clock cycle.

A third type of memory access conflict is a core-DMA memory access conflict. A core-DMA memory access conflict occurs when a core and a DMA engine (e.g., a particular channel of a DMA engine) attempt to access the same memory bank in the same clock cycle.

A fourth type of memory access conflict is a DMA-DMA memory access conflict. A DMA-DMA memory access conflict occurs when two or more DMAs (e.g., channels of DMAs) access the same memory bank in the same clock cycle.

In the example DFG illustrated in FIG. 7, the buffers shown are shared buffers. A shared buffer is a buffer that is accessed by at least two different kernels. For example, buf1 and buf2 in FIG. 7A are examples of shared buffers as each is shared by node i2 and node i3, where node i2 is the producer and node i3 is the consumer. A local buffer refers to a buffer that is accessed by a single kernel, e.g., only a single kernel. For example, a local buffer may be working memory for a kernel. A local buffer for a node may be illustrated in the DFG with an arc that begins at the node and circles back ending at the same node. In another aspect, the system is capable of distinguishing between local buffers and shared buffers in the DFG. The system further may apply different mapping rules or techniques to local buffers than are applied to shared buffers when mapping the DFG to the DPE array.

In an example implementation, the system may use a two-pronged approach to address memory conflicts. The two prongs may include memory conflict avoidance and memory conflict minimization. Regarding memory conflict avoidance, the system is capable of avoiding memory access conflicts for shared buffers that may occur between the producer kernel and the consumer kernel by ensuring that double buffers (e.g., the ping buffer and the pong buffer) are mapped to different memory banks of a memory module. The system is capable of avoiding memory access conflicts for local buffers by ensuring that local buffers for different kernels are mapped to different memory banks of the memory module. The system is capable of avoiding intra-core memory conflicts by mapping all buffers accessed by a same and single kernel to different memory banks of a memory module.

Regarding conflict minimization, the system is capable of formulating the mapping problem in a manner that reduces the number of independent actors that are capable of accessing a given memory bank. The independent actors in this case are cores of DPEs and DMA channels of the DMA engines in the DPEs. Given the size of the device (e.g., the size of the DPE array), an ILP formulation of the mapping problem may be expensive in terms of the number of variables required. In such a formulation, each core and each DMA channel would be represented by a variable. The number of cores is C×R, where C is the number of columns of DPEs and R is the number of rows of DPEs in the device. The number of DMA channels is C×R×4. Accordingly, in one aspect, for purposes of generating the ILP formulation, the DMA channels are represented as two distinct actors (e.g., a reader and a writer). As such, the number of DMA channels in the DPE array may be reduced from C×R×4 to 2, which can significantly simply the ILP formulation.

Depending on the type and/or size of the application to be implemented in the DPE array, complete avoidance of conflicts may not be possible. In this regard, the system may include preferences that allow a user to choose from one or more conflict avoidance or conflict minimization settings.

For purposes of this disclosure, the term "conflict minimization" may be used to refer to conflict avoidance where the system is capable of minimizing the presence of memory access conflicts to zero.

Figure 11:
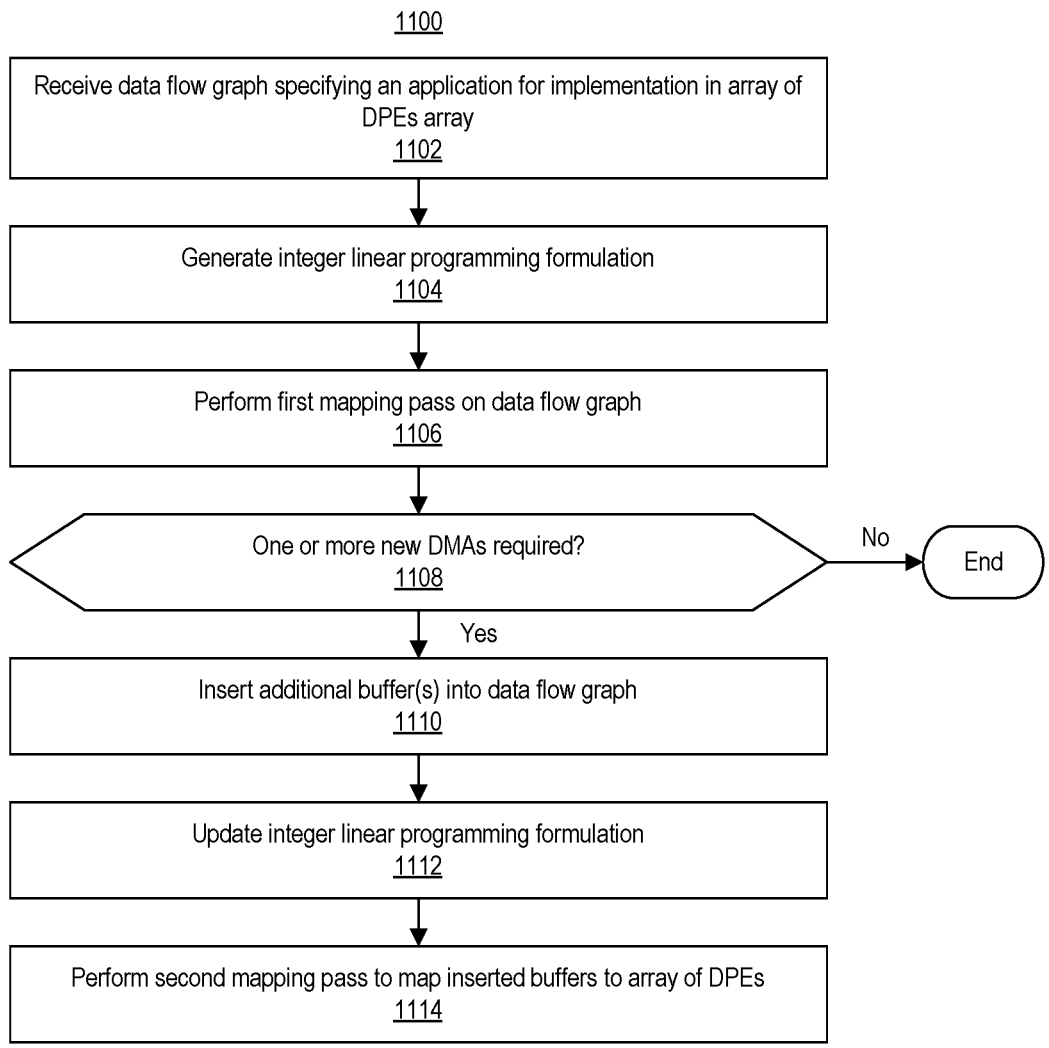
FIG. 11 illustrates an example method of mapping an application onto an array of DPEs.

FIG. 11 illustrates an example method 1100 of mapping an application onto an array of DPEs. Method 1100 may be performed by system 102 described in connection with FIG. 1. An example array of DPEs is DPE array 202 as described within this disclosure.

In block 1102, the system receives a DFG specifying an application for implementation in the array of DPEs. The DFG includes a plurality of nodes connected by arcs. Each node of the DFG represents a kernel that is to be implemented within the IC. Certain kernels may be designated for implementation in PL while other kernels are designated for implementation in the array of DPEs. Each node designated for implementation in the array of DPEs is to be assigned to a core of a particular DPE. Each arc represents a data transfer that occurs between kernels linked by the arc. As discussed, arcs represent buffers that are to be assigned to memory within the array of DPEs and enable communication between the kernels.

In one aspect, the DFG (e.g., the application) may be partitioned. A partition is a group of one or more kernels that are to be assigned to a single (e.g., same) core of a DPE. Partitioning allows kernels to be grouped so that a single core of a DPE is capable of implementing more than one kernel concurrently. In one aspect, the DFG may have undergone partitioning prior to undergoing mapping as described in connection with FIG. 11.

In block 1104, the system generates an ILP formulation. The system is capable of generating the ILP formulation from the DFG. The ILP formulation includes a plurality of variables and constraints for mapping the DFG onto the array of DPEs.

In one aspect, the array of DPEs has an architecture defined by a device description. In generating the ILP formulation, the system uses the device description of the array of DPEs. The device description specifies the architecture of the array of DPEs as described within this specification. For example, the device description is capable of specifying the number of DPEs in the array, the physical layout of the DPEs in the array (e.g., positioning of each DPE within the array relative to the other DPEs), and the connectivity among the DPEs of the array. In one aspect, the system is programmed with the device description. In another aspect, the system receives a user input specifying the device description to be used. For example, the user may provide an input to the system specifying a particular IC, which has a particular DPE array and DPE array architecture. The system, based on the user input, may select the device description for the specified IC. In any case, the system is capable of using the device description to generate the variables and/or constraints of the ILP formulation.

In block 1106, the system performs a first mapping pass on the DFG. During the first mapping pass, the system determines a mapping of the nodes of the DFG to cores within the array of DPEs and arcs of the DFG to memory modules within the array of DPEs. The mapping may also assign I/O nodes (e.g., and data transfers to and from such nodes) to tiles and communication channels in the SoC interface block. In one aspect, the mapping that is determined is one that solves the ILP formulation and that minimizes one or more cost functions.

In an example implementation, the cost function(s) account for DMA engine usage and/or memory conflicts. For example, the system performs the first mapping pass by minimizing DMA engine usage (e.g., the number of DMA engines used or needed to perform the data transfers for the mapping solution found). In another aspect, the system minimizes the presence of memory conflicts in the array of DPEs. The system may minimize both DMA engine usage and the presence of memory conflicts.

In block 1108, the system determines whether one or more new DMA engines are required to implement the mapping determined in block 1106. As discussed, a mapping of nodes to cores and arcs to memories that requires a DMA engine to be used that is not already specified in the DFG indicates that one or more additional buffers are needed to implement the DFG in the array of DPEs using the mapping generated in block 1106. If one or more new DMA engines are required, method 1100 continues to block 1110. If no new DMA engines are required, method 1100 ends.

In the case where no new DMA engines are needed, there are two possible outcomes. A first possible outcome is that the system generated a mapping solution in block 1106 that successfully maps the DFG to the array of DPEs without using any additional DMAs. In that case, the mapping generated in block 1106 may be used in implementing the DFG using the array of DPEs.

A second possible outcome is that the first mapping pass failed to generate a feasible mapping solution. This may occur for any of a variety of reasons. One reason may be that the DFG specifies a greater number of partitions than available cores in the array of DPEs. Another reason may be that the DFG requires buffers that are so large that the system is unable to place the buffers in the available memory of the array of DPEs (e.g., the DPE array has insufficient memory for the buffers specified in the DFG). In either case, the first mapping pass fails.

Continuing with block 1110, the system inserts one or more additional buffers into the DFG. The system is capable of inserting one or more buffers into the DFG for each pair of partitions that are connected by one or more arcs that require a newly inserted DMA engine. In general, the system replicates each buffer that connects the two partitions.

For purposes of illustration, consider the example DFG of FIG. 7. In the example of FIG. 7, node i2 and node i3 are connected by four arcs representing four buffers. For ease of description, it can be assumed that node i2 constitutes one partition and node i3 constitutes another partition. In the event that node i2 and node i3 are mapped to cores that do not have a common neighboring memory module, a DMA engine is required. Use of a DMA engine for the memory transfers corresponds to FIG. 10 and requires twice the number of buffers as required when a DMA engine is not required (e.g., as shown in FIG. 9). Accordingly, the system is capable of replicating the buffers used to connect node i2 and node i3. The system inserts four additional buffers in the form of four additional arcs connecting node i2 to node i3. The additional buffers are of the same size as the existing buffers connecting node i2 to node i3 (e.g., the system replicates each arc connecting node i2 to node i3).

In block 1112, the system updates the ILP formulation to reflect the additional buffers inserted into the DFG. For example, the system updates the ILP variables and constraints to reflect the additional buffers created in block 1110.

In block 1114, the system performs a second mapping pass to map the inserted buffers to the array of DPEs. For example, the system is capable of mapping the additional buffers inserted into the DFG in block 1110 onto the array of DPEs. The system maps the additional buffers to memory modules, e.g., to particular memory banks in particular memory modules of the array of DPEs. In one aspect, the system is capable of performing the second mapping pass by minimizing the presence of memory conflicts in the array of DPEs.

The mapping problem solved in the second pass differs from the mapping problem solved in the first pass due to the addition of the new buffers in the DFG. The system is capable of performing the second mapping pass in significantly less time than the first mapping pass since the mapping solution generated in the first mapping pass may be used as a starting point or constraint for the second mapping pass. As such, the system need only place the newly inserted buffers. During the second pass, the system does not minimize the number of DMAs that are used.

For purposes of illustration, an example ILP formulation is described below that may be used in performing the first and/or second passes of FIG. 11. As discussed, the ILP formulation generated in block 1104 of FIG. 11 includes a plurality of different variables and constraints.

In the ILP formulation, the system is capable of representing the mapping of partitions to cores of the DPE array using binary variables $X_{tp}$. More particularly, for each partition, which includes one or more kernels, the binary variable $X_{tp}=1$ if and only if partition t is mapped to the core p.

In the ILP formulation, the system is capable of representing data (e.g., buffers) to memory banks using the binary variables $Y_{dm}$. More particularly, the variable $Y_{dm}=1$ if and only if data d is mapped to memory bank m.

In one aspect, the DFG is represented as an adjacency Boolean matrix G. Within the Boolean matrix G, the variable $G_{td}=1$ if and only if partition t is accessing data d.

In the ILP formulation, the system is capable of representing the cost of accessing a memory bank m from core p as a constant $C_{pm}$. If the memory bank m is adjacent (e.g., a neighbor) to core p, then $C_{pm}=0$. If the memory bank m is not adjacent (e.g., not a neighbor) to core p, then $C_{pm}=\text{DMACOST}$.

Within the ILP formulation, the cost of data access by partitions may be modeled using the variables $AC_{td}$. The variable $AC_{td}$ indicates the cost of accessing data d by partition t. Expression 1 below is a quadratic representation of the cost function.

$$AC_{td} = \Sigma_{pm}(X_{tp} * Y_{dm} * C_{pm}) \quad \text{Expression 1:}$$

Expression 2 below is a linear approximation of Expression 1. Expression 2 may be used as a substitute for Expression 1 in the ILP formulation and in performing method 1100 of FIG. 11.

$$AX_{tp} * \text{DMACOST} + \Sigma_m(Y_{dm} * C_{pm}) - AC_{td} \leq \text{DMACOST} \quad \text{Expression 2:}$$

Accordingly, given Expression 2, the system, in solving the ILP formulation, does so while also trying to achieve the objective of minimizing the quantity $\Sigma_{t,d}AC_{td}$, which is the total number of DMA engines used.

As discussed, in another aspect, in solving the ILP formulation, the system may also try to achieve the objective of minimizing memory conflicts. In one aspect, the variables $XM_{tm}$ represent partition to memory accesses. The variable $XM_{tm}=1$ if and only if partition t accesses memory bank m. The variable $XM_{tm}$ can be approximated in terms of Y as illustrated below in Expression 3.

$$\Sigma_d(G_{pd} * Y_{dm}) - \text{degree}(t) * XM_{tm} \leq 0, \quad \text{Expression 3:}$$

where $\text{degree}(t) = \Sigma_t G_{td}$

The ILP formulation may also include DMA-to-memory access variables $YM_{im}$. The variable $YM_{im}=1$ if and only if DMA i accesses memory bank m.

The ILP formulation may also include memory conflict cost modeling variables $MC_m$ as used in Expression 4 below.

$$-MC_m + \Sigma_t(XM_{tm} * \text{CONFLICTCOST} + YM_{im} * \text{CONFLICTCOST}) \leq 2 * \text{CONFLICTCOST} \quad \text{Expression 4:}$$

In Expression 4, the term CONFLICTCOST is a constant value that represents the cost of a memory conflict. The right-hand side of the equation is 2*CONFLICTCOST since penalty free access is permitted to a memory bank for 2 cores and/or DMA engines. Any additional accessors to a memory bank have a cost associated with their access. This formulation accommodates the usual case of data flow computations having a producer and a consumer.

Accordingly, given Expression 4, the system, in solving the ILP formulation, does so while trying to achieve the objective of minimizing the quantity $\Sigma_m MC_m$, which is the total cost of memory conflicts for all memory banks.

As discussed, the DMA engines can be modeled as two distinct actors (e.g., a reader and a writer) to reduce the number of variables needed in the ILP formulation. For example, since a DMA engine in a DPE can access only the memory bank in its own DPE, each DMA engine can be modeled using 2 DMA representations in the ILP formulation. These DMA representations correspond to a MM2S DMA (e.g., memory-to-stream DMA) and a S2MM DMA (stream-to-memory DMA). In the above example formulation, i=0 for S2MM and i=1 for MM2S.

In the examples described within this disclosure, the system is capable of solving the ILP formulation while attempting to reach the objectives of minimizing DMA usage and/or minimizing memory conflicts. In another aspect, the system may implement a greedy mapping heuristic where neighboring partitions of the DFG are placed in a preferred (e.g., predetermined) or sorted order onto neighboring cores of the DPE array. In another aspect, the described heuristic may be augmented with a backtracking technique where the system is capable of repositioning (e.g., re-mapping) partitions to minimize overall data transfer cost using the two phase approach described in connection with FIG. 11.

For example, the system is capable of mapping an application intended for implementation using the DPE array onto the various DPEs in the DPE array using one or more heuristics. For example, the system is capable of ordering nodes of the DFG in decreasing order of priority. The system may decide priority based on one or more factors. Examples of the factors can include, but are not limited to, the height of the node in the DFG graph, the total degree of the node (e.g., the sum of all edges entering and leaving the node), and/or the type of edges connected to the node such as memory, stream, and cascade. The system is capable of placing the node on the best DPE available based on affinity and validity. The system is capable of determining validity based on whether all resource requirements of this node can be met on a given DPE (e.g., compute resources, memory buffers, stream resources). The system is capable of determining affinity based on one or more other factors. Examples of affinity factors may include placing the node on the same DPE or an adjacent DPE where the neighbors of this node have already been placed to minimize DMA communication, architectural constraints such as whether this node is part of a cascade chain, and/or finding a DPE that has maximally free resources. If the node is placed with all constraints being met, the system is capable of increasing priority of neighboring nodes of the placed node so that such nodes are handled next. If no available placement is valid for the current node, the system may try to unplace some other nodes from their best candidate DPE(s) to make room for this node. The system may put the unplaced nodes back on the priority queue to be placed again. The system is capable of limiting the total effort expended in finding a good solution by keeping track of the total number of placements and unplacements performed.

In still another aspect, the ILP formulation and/or heuristic approach described may incorporate a latency minimization objective. For example, the system is capable of attempting to minimize the latency of stream-based communication by minimizing the distance between the source (producer) and the sink (consumer).

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method may include, in a first pass, mapping, using computer hardware, a DFG onto an array of DPEs by minimizing DMA circuit usage and memory conflicts in the array of DPEs and, in response to determining that a mapping solution generated by the first pass requires an additional DMA engine not specified by the DFG, inserting, using the computer hardware, additional buffers into the DFG. The method may include, in a second pass, mapping, using the computer hardware, the additional buffers onto the array of DPEs by minimizing the memory conflicts in the array of DPEs.

The DFG may include a plurality of nodes representing kernels and a plurality of arcs representing buffers. The plurality of arcs link the plurality of nodes.

The method may include minimizing the DMA engine usage by determining at least a portion of a cost for the mapping solution based, at least in part, on whether data transfers between the buffers and the kernels require the DMA engines in the array of DPEs.

Each DPE of the array of DPEs may include a core and a memory module, wherein the mapping of the first pass includes assigning the plurality of nodes to the cores of the array of DPEs and assigning the plurality of arcs to the memory modules.

The method may include assigning the plurality of arcs to particular memory banks of the memory modules.

The plurality of nodes may be grouped into partitions with each partition having one or more nodes. The assigning the plurality of nodes to the cores of the array of DPEs may include assigning each partition to one core.

The mapping of the first pass and the mapping of the second pass may be performed by solving ILP formulations.

The memory conflicts may include intra-core memory access conflicts, inter-core memory access conflicts, core-to-DMA memory conflicts, and DMA-to-DMA memory access conflicts.

A system includes a processor configured to initiate operations. The operations may include, in a first pass, mapping a DFG onto an array of DPEs by minimizing DMA circuit usage and memory conflicts in the array of DPEs and, in response to determining that a mapping solution generated by the first pass requires an additional DMA engine not specified by the data flow graph, inserting additional buffers into the data flow graph. The operations may include, in a second pass, mapping the additional buffers onto the array of DPEs by minimizing the memory conflicts in the array of DPEs.

The data flow graph may include a plurality of nodes representing kernels and a plurality of arcs representing buffers. The plurality of arcs link the plurality of nodes.

The processor may be configured to initiate operations further including minimizing the DMA engine usage by determining at least a portion of a cost for the mapping solution based, at least in part, on whether data transfers between the buffers and the kernels require the DMA engines in the array of DPEs.

Each DPE of the array of DPEs may include a core and a memory module. The mapping of the first pass may include assigning the plurality of nodes to the cores of the array of DPEs and assigning the plurality of arcs to the memory modules.

The assigning the plurality of arcs to the memory modules may include assigning the plurality of arcs to particular memory banks of the memory modules.

The plurality of nodes may be grouped into partitions with each partition having one or more nodes. The assigning the plurality of nodes to the cores of the array of DPEs may include assigning each partition to one core.

The mapping of the first pass and the mapping of the second pass may be performed by solving ILP formulations.

The memory conflicts may include intra-core memory access conflicts, inter-core memory access conflicts, core-to-DMA memory conflicts, and DMA-to-DMA memory access conflicts.

A method may include receiving, using computer hardware, a DFG specifying a plurality of nodes connected by a plurality of arcs, wherein the nodes represent kernels and the arcs represent buffers used by the kernels, and generating, using the computer hardware, an ILP formulation from the data flow graph, wherein the ILP formulation includes a plurality of variables and constraints for mapping the data flow graph onto an array of DPEs. The method may include determining, using the computer hardware, a mapping of the nodes to cores within the array of DPEs and the arcs to memory modules within the array of DPEs that solves the ILP formulation while minimizing one or more cost functions.

One or more of the cost functions may minimize use of DMA engines and memory conflicts in the array of DPEs.

The one or more of the cost functions may minimize memory conflicts. The memory conflicts may include intra-core memory access conflicts, inter-core memory access conflicts, core-to-DMA memory conflicts, and DMA-to-DMA memory access conflicts.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    generating, using computer hardware, a first integer linear programming (ILP) formulation for a data flow graph based, at least in part, on a programmatic device description specifying an architecture of an array of data processing engines, wherein the first ILP formulation includes binary variables and one or more cost functions that minimize usage of direct memory access (DMA) circuits and memory conflicts in the array of data processing engines;
    wherein the data flow graph specifies an application and includes nodes linked by arcs, wherein the nodes represent kernels and the arcs represent buffers, and wherein DMA circuits of the data processing engines are used by selected ones of the kernels assigned to cores of the data processing engines to access selected ones of the buffers assigned to non-adjacent memory modules of the data processing engines;
    in a first pass, mapping, using the computer hardware, the data flow graph onto the array of data processing engines by solving the first ILP formulation;
    in response to determining that a mapping solution generated by the first pass requires an additional DMA circuit not specified by the data flow graph, inserting, using the computer hardware, one or more additional buffers into the data flow graph to accommodate the additional DMA circuit;
    generating, using the computer hardware, a second ILP formulation corresponding to the data flow graph including the one or more additional buffers that minimizes the memory conflicts in the array of data processing engines; and
    in a second pass, mapping, using the computer hardware, the one or more additional buffers onto the array of data processing engines by solving the second ILP formulation;
    wherein the mapping performed by the first and second passes specifies an implementation of the application for execution in the array of data processing engines that minimizes data flow in the array of data processing engines.

2. The method of claim 1, wherein the array of data processing engines has a predefined circuit architecture.

3. The method of claim 1, wherein the one or more cost functions used in the first ILP formulation minimize the usage of the DMA circuits by increasing a cost for the mapping solution for data transfers between the buffers and the kernels that require the DMA circuits in the array of data processing engines.

4. The method of claim 1, wherein each data processing engine of the array of data processing engines comprises a core and a memory module, wherein the mapping of the first pass comprises:
    assigning the nodes to the cores of the array of data processing engines; and
    assigning the arcs to the memory modules.

5. The method of claim 4, further comprising:
    assigning the arcs to particular memory banks of the memory modules.

6. The method of claim 4, wherein the nodes are grouped into partitions with each partition having one or more nodes, wherein the assigning the nodes to the cores of the array of data processing engines comprises:
    assigning each partition to one core.

7. The method of claim 1, wherein the second ILP formulation omits minimizing the usage of the DMA circuits.

8. The method of claim 1, wherein the memory conflicts include intra-core memory access conflicts, inter-core memory access conflicts, core-to-DMA memory conflicts, and DMA-to-DMA memory access conflicts.

9. A system, comprising:
    a processor configured to initiate operations including:
        generating a first integer linear programming (ILP) formulation for a data flow graph based, at least in part, on a programmatic device description specifying an architecture of an array of data processing engines, wherein the first ILP formulation includes binary variables and one or more cost functions that minimize usage of direct memory access (DMA) circuits and memory conflicts in the array of data processing engines;

wherein the data flow graph specifies an application and includes nodes linked by arcs, wherein the nodes represent kernels and the arcs represent buffers, and wherein DMA circuits of the data processing engines are used by selected ones of the kernels assigned to cores of the data processing engines to access selected ones of the buffers assigned to non-adjacent memory modules of the data processing engines;

in a first pass, mapping the data flow graph onto the array of data processing engines by solving the first ILP formulation;

in response to determining that a mapping solution generated by the first pass requires an additional DMA circuit not specified by the data flow graph, inserting one or more additional buffers into the data flow graph to accommodate the additional DMA circuit;

generating a second ILP formulation corresponding to the data flow graph including the one or more additional buffers that minimizes the memory conflicts in the array of data processing engines; and in a second pass, mapping the one or more additional buffers onto the array of data processing engines by solving the second ILP formulation;

wherein the mapping performed by the first and second passes specifies an implementation of the application for execution in the array of data processing engines that minimizes data flow in the array of data processing engines.

10. The system of claim 9, wherein the array of data processing engines has a predefined circuit architecture data.

11. The system of claim 9, wherein the one or more cost functions used in the first ILP formulation minimizes the usage of the DMA circuits.

12. The system of claim 9, wherein each data processing engine of the array of data processing engines comprises a core and a memory module, wherein the mapping of the first pass comprises:

assigning the nodes to the cores of the array of data processing engines; and assigning the arcs to the memory modules.

13. The system of claim 12, wherein the assigning the arcs to the memory modules comprises:

assigning the arcs to particular memory banks of the memory modules.

14. The system of claim 12, wherein the nodes are grouped into partitions with each partition having one or more nodes, wherein the assigning the nodes to the cores of the array of data processing engines comprises:

assigning each partition to one core.

15. The system of claim 9, wherein the second ILP formulation omits minimizing the usage of the DMA circuits.

16. The system of claim 9, wherein the memory conflicts include intra-core memory access conflicts, inter-core memory access conflicts, core-to-DMA memory conflicts, and DMA-to-DMA memory access conflicts.

17. A computer program product, comprising:

one or more computer readable storage media, and program instructions collectively stored on the one or more computer readable storage media, wherein the program instructions are executable by computer hardware to initiate operations including:

generating a first integer linear programming (ILP) formulation for a data flow graph based, at least in part, on a programmatic device description specifying an architecture of an array of data processing engines, wherein the first ILP formulation includes binary variables and one or more cost functions that minimize usage of direct memory access (DMA) circuits and memory conflicts in the array of data processing engines;

wherein the data flow graph specifies an application and includes nodes linked by arcs, wherein the nodes represent kernels and the arcs represent buffers, and wherein DMA circuits of the data processing engines are used by selected ones of the kernels assigned to cores of the data processing engines to access selected ones of the buffers assigned to non-adjacent memory modules of the data processing engines;

in a first pass, mapping the data flow graph onto the array of data processing engines by solving the first ILP formulation;

in response to determining that a mapping solution generated by the first pass requires an additional DMA circuit not specified by the data flow graph, inserting one or more additional buffers into the data flow graph to accommodate the additional DMA circuit;

generating a second ILP formulation corresponding to the data flow graph including the one or more additional buffers that minimizes the memory conflicts in the array of data processing engines; and in a second pass, mapping the one or more additional buffers onto the array of data processing engines by solving the second ILP formulation;

wherein the mapping performed by the first and second passes specifies an implementation of the application for execution in the array of data processing engines that minimizes data flow in the array of data processing engines.

18. The computer program product of claim 17, wherein the array of data processing engines has a predefined circuit architecture.

19. The computer program product of claim 17, wherein the one or more cost functions used in the first ILP formulation minimizes the usage of DMA circuits by increasing a cost for the mapping solution for data transfers between the buffers and the kernels that require the DMA circuits in the array of data processing engines.

20. The computer program product of claim 17, wherein the second ILP formulation omits minimizing the usage of the DMA circuits.

* * * * *